United States Patent
Fukao et al.

(10) Patent No.: US 10,053,181 B2
(45) Date of Patent: Aug. 21, 2018

(54) BICYCLE SHIFT OPERATING DEVICE

(75) Inventors: Kazutaka Fukao, Osaka (JP); Yoshimitsu Miki, Osaka (JP)

(73) Assignee: Shimano Inc., Osaka (JP)

( * ) Notice: Subject to any disclaimer, the term of this patent is extended or adjusted under 35 U.S.C. 154(b) by 973 days.

(21) Appl. No.: 13/484,065

(22) Filed: May 30, 2012

(65) Prior Publication Data

US 2013/0319166 A1 Dec. 5, 2013

(51) Int. Cl.
- G05G 1/04 (2006.01)
- B62K 23/06 (2006.01)
- B62M 25/04 (2006.01)
- F16H 59/02 (2006.01)
- F16H 59/04 (2006.01)

(52) U.S. Cl.
CPC ............. *B62K 23/06* (2013.01); *B62M 25/04* (2013.01); *F16H 59/0278* (2013.01); *F16H 59/04* (2013.01); *B60Y 2200/134* (2013.01); *Y10T 74/20438* (2015.01); *Y10T 74/20582* (2015.01)

(58) Field of Classification Search
USPC .................. 74/473.14, 489, 501.6, 502.2
See application file for complete search history.

(56) References Cited

U.S. PATENT DOCUMENTS

| | | | |
|---|---|---|---|
| 5,257,683 A | 11/1993 | Romano | |
| 5,400,675 A | 3/1995 | Nagano | |
| 5,653,649 A | 8/1997 | Watarai | |
| 6,015,036 A | 1/2000 | Fukuda | |
| 7,350,436 B2 | 4/2008 | Fujii | |
| 7,665,384 B2 | 2/2010 | Sato et al. | |
| 7,874,229 B2 | 1/2011 | Tetsuka | |
| 7,950,307 B2 | 5/2011 | Miki | |
| 2002/0020246 A1* | 2/2002 | Campagnolo | 74/502.2 |
| 2002/0124679 A1* | 9/2002 | Dal Pra | 74/502.2 |
| 2007/0012137 A1 | 1/2007 | Dal Pra' | |
| 2007/0137388 A1 | 6/2007 | Dal Pra' | |
| 2008/0210043 A1 | 9/2008 | De Perini | |
| 2008/0314191 A1* | 12/2008 | Miki et al. | 74/502.2 |
| 2011/0079103 A1* | 4/2011 | Kususe et al. | 74/502.2 |
| 2011/0314947 A1* | 12/2011 | Kawakami | 74/473.14 |
| 2012/0272772 A1 | 11/2012 | Lin | |

FOREIGN PATENT DOCUMENTS

| | | |
|---|---|---|
| CN | 1102813 A | 5/1995 |
| CN | 102381434 A | 3/2012 |

* cited by examiner

*Primary Examiner* — Richard W Ridley
*Assistant Examiner* — Brian J McGovern
(74) *Attorney, Agent, or Firm* — Global IP Counselors, LLP

(57) ABSTRACT

A bicycle shift operating device is provided with a mounting bracket, a shift unit, an attachment member and an operating member. The shift unit is disposed in the mounting bracket. The attachment member is removably attached to the mounting bracket. The operating member is movably mounted on the attachment member. The operating member is mechanically coupled to the shift unit to operate the shift unit while the attachment member is attached to the mounting bracket, and the operating member is mechanically disengaged from the shift unit while the attachment member is removed from the mounting bracket.

13 Claims, 19 Drawing Sheets

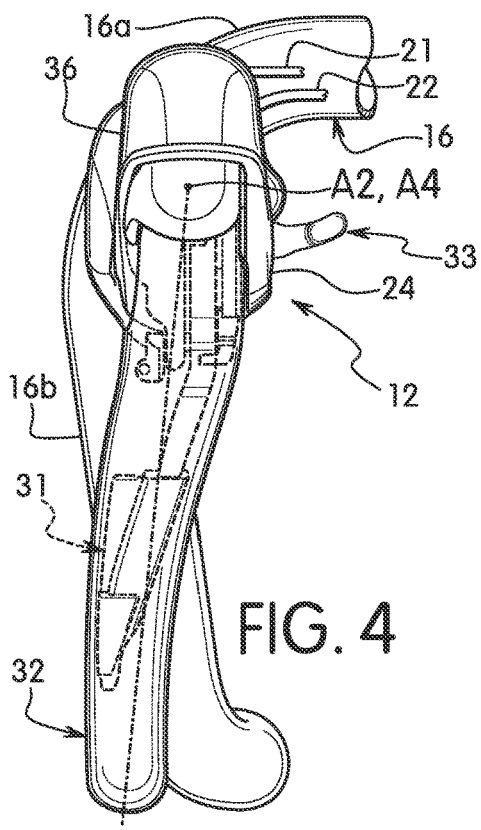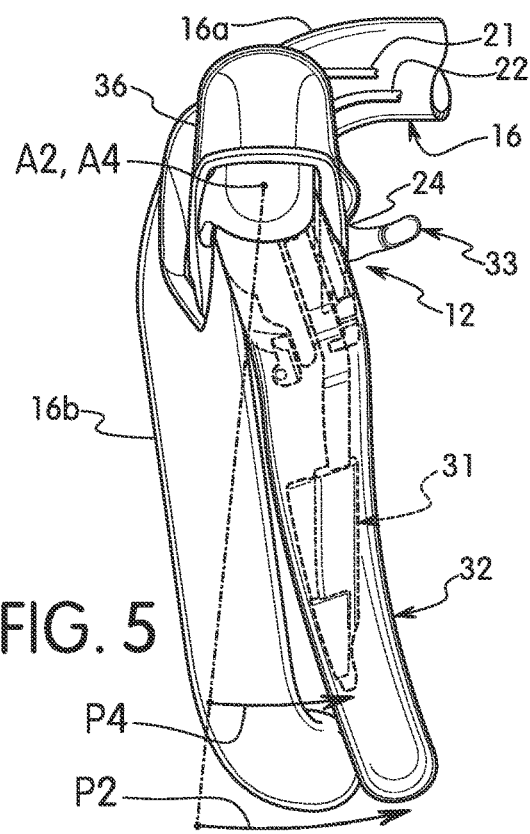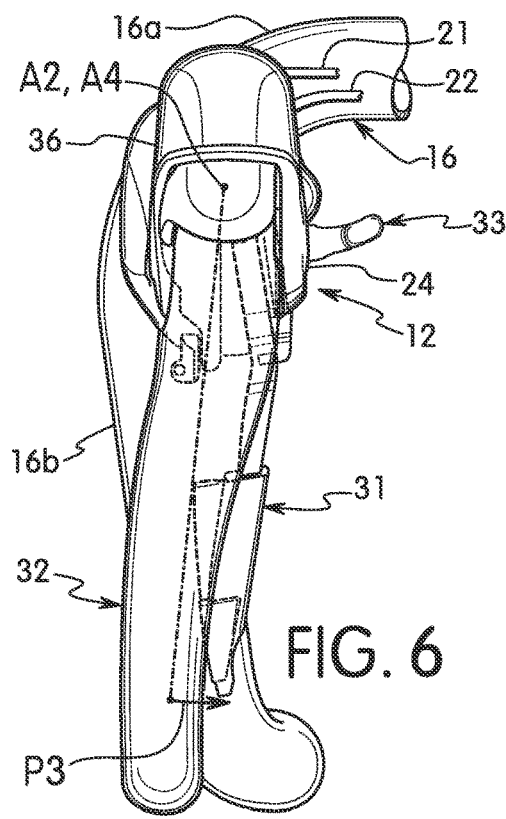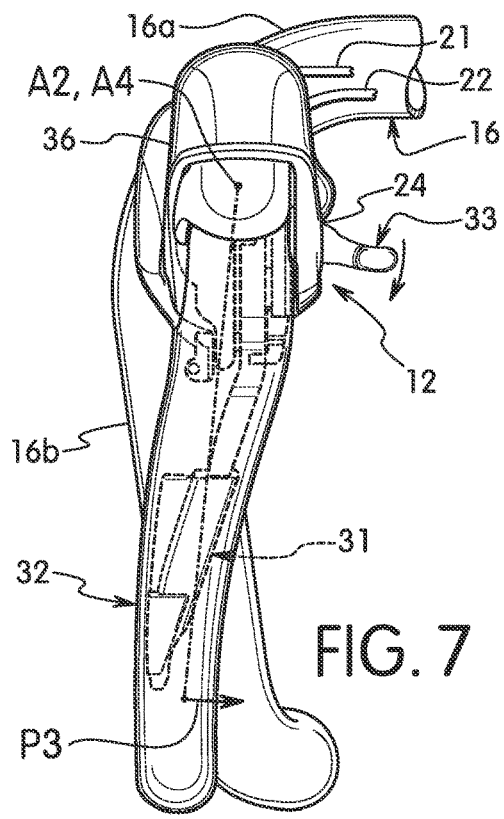

BICYCLE SHIFT OPERATING DEVICE

BACKGROUND

Field of the Invention

This invention generally relates to a bicycle shift operating device. More specifically, the present invention relates to a bicycle shift operating device having an adjustment arrangement for adjusting a rest position of an operating lever.

Background Information

Bicycle operating devices are usually provided on a bicycle for a rider to operate various bicycle components such as operating brakes and changing gears. The bicycle operating devices that are used for changing gears are often called shifters. Most mechanical shifters use a control cable that connects the shifter to a gear changing device for shifting the gear changing device between gears. Some shifters use a single operating lever to perform both upshifting operations and downshifting operations, while other shifters use a first operating lever to perform upshifting operations and a second operating lever to perform downshifting operations. Also some shifters integrate braking into one of the operating levers. In the case of a road bicycle with a dropdown handlebar, shifters that perform a dual function of shifting and braking are sometimes referred to as a brifter. In some cases, a brake lever that is integrated into to the shifter such that the brake lever has the dual function. Examples of brake/shift operating devices are disclosed in U.S. Pat. No. 5,400,675 to Nagano (assigned to Shimano, Inc), U.S. Pat. No. 5,257,683 to Romano (assigned to Campagnolo) and U.S. Publication Patent No. 2007-0012137 to Dal Pra' (assigned to Campagnolo).

SUMMARY

Generally, the present disclosure is directed to various features of a bicycle shift operating device. In one feature, a bicycle shift operating device is provided in which the bicycle shift operating device comprises a mounting bracket, a shift unit, an attachment member and an operating member. The shift unit is disposed in the mounting bracket. The attachment member is attached to the mounting bracket. The operating member is movably mounted on the attachment member. The operating member is mechanically coupled to the shift unit to operate the shift unit.

Other objects, features, aspects and advantages of the disclosed bicycle shift operating device will become apparent to those skilled in the art from the following detailed description, which, taken in conjunction with the annexed drawings, discloses one embodiment of the bicycle shift operating device.

BRIEF DESCRIPTION OF THE DRAWINGS

Referring now to the attached drawings which form a part of this original disclosure:

FIG. 4 is a front elevational view of the right bicycle operating device illustrated in FIGS. 1 to 3 with the first and second primary operating levers in their rest positions;

FIG. 5 is a front elevational view of the right bicycle operating device illustrated in FIGS. 1 to 4 in which the second primary (brake/shift) operating lever has been operated (i.e., pivoted) to an operated position with the first primary (release) operating lever being moved by the second primary (brake/shift) operating lever;

FIG. 6 is a front elevational view of the right bicycle operating device illustrated in FIGS. 1 to 5 in which the second primary (brake/shift) operating lever is in the rest position and the first primary (release) operating lever has been operated (i.e., pivoted) to an operated position;

FIG. 7 is a front elevational view of the right bicycle operating device illustrated in FIGS. 1 to 5 in which the first and second operating levers are both in their rest positions and the secondary (release) operating lever has been operated (i.e., pivoted) to an operated position;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
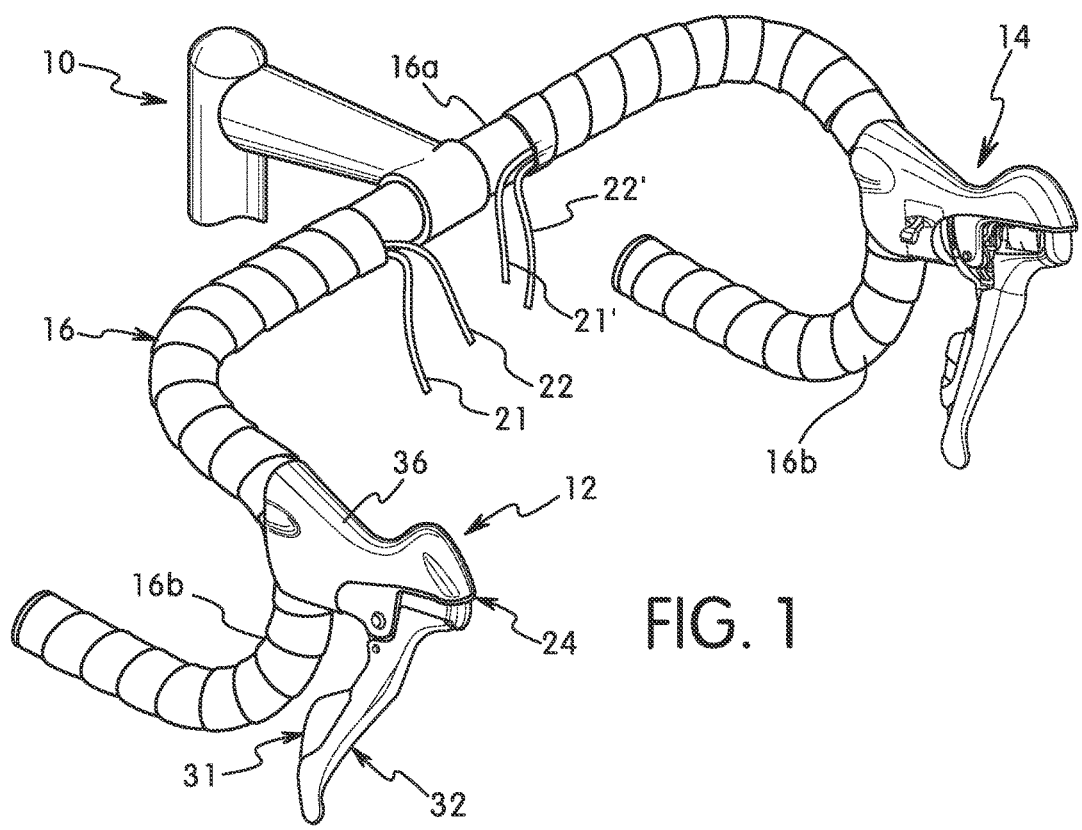
FIG. 1 is a front perspective view of a portion of a bicycle equipped with a pair of bicycle operating devices coupled to a drop type handlebar in their installed positions in accordance with one illustrative embodiment.

Referring initially to FIG. 1, a portion of a bicycle 10 that is equipped with a pair of bicycle shift and brake operating devices (hereinafter bicycle operating device) 12 and 14 is illustrated in accordance with one illustrative embodiment. The bicycle operating devices 12 and 14 are mounted on a drop down handlebar 16 in accordance with the illustrated embodiment as seen in FIG. 1. The bicycle operating devices 12 and 14 constitute examples of bicycle shift operating devices since they each include a shifting function. The drop down handlebar 16 typically includes a straight cross portion 16a and a pair of downwardly curved portions 16b. The straight cross portion 16a connects upper ends of the downwardly curved portions 16b. The bicycle operating devices 12 and 14 are mounted to the downwardly curved portions 16b of the drop down handlebar 16.

The bicycle operating device 12 is a right operating device operated by the rider's right hand to operate a first brake device (not shown) and a first gear shifting device (e.g., a cable operated rear derailleur). The bicycle operating device 14 is a left operating device operated by the rider's left hand to operate a second brake device (not shown) and a second gear shifting device (e.g., a cable operated front derailleur). The first and second gear shifting devices are part of a conventional bicycle driving system that is used to shift a bicycle chain for changing speeds of the drive train in a relatively conventional manner.

In the illustrated embodiment, the bicycle operating device 12 is operatively coupled to a brake device via a brake control cable 21 and to a gear shifting device via a shift control cable 22. In the illustrated embodiment, the bicycle operating device 14 is operatively coupled to a brake device via a brake control cable 21' and to a gear shifting device via a shift control cable 22. Thus, the bicycle operating devices 12 and 14 are bicycle braking-shifting devices, which are also known as a bicycle brifter. In other words, a bicycle brifter is a device that includes both a braking function and a shifting function in a single unit that is mounted to the bicycle. A bicycle dropdown brifter is a device that is specifically configured to be mounted to one of the downwardly curved portions 16b of the dropdown bicycle handlebar 16, as illustrated in FIG. 1, and that includes both braking and shifting functions in a single unit.

Figure 2:
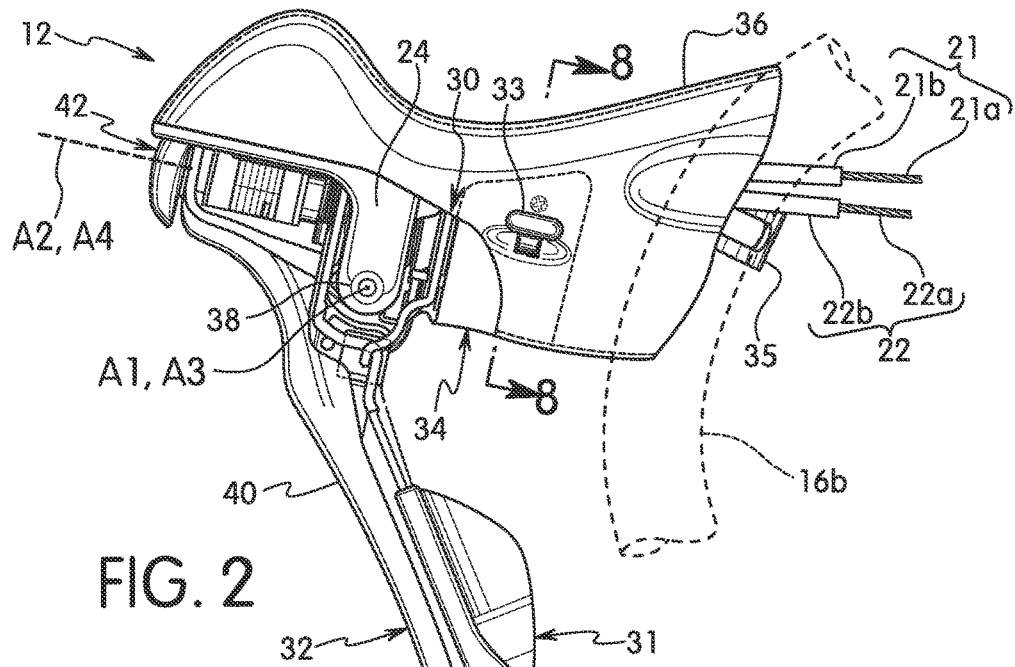
FIG. 2 is an inside elevational view of the right bicycle operating device illustrated in FIG. 1 with the first primary (release) operating lever and the second primary (brake/shift) operating lever in their rest (non-operating) positions.
Figure 3:
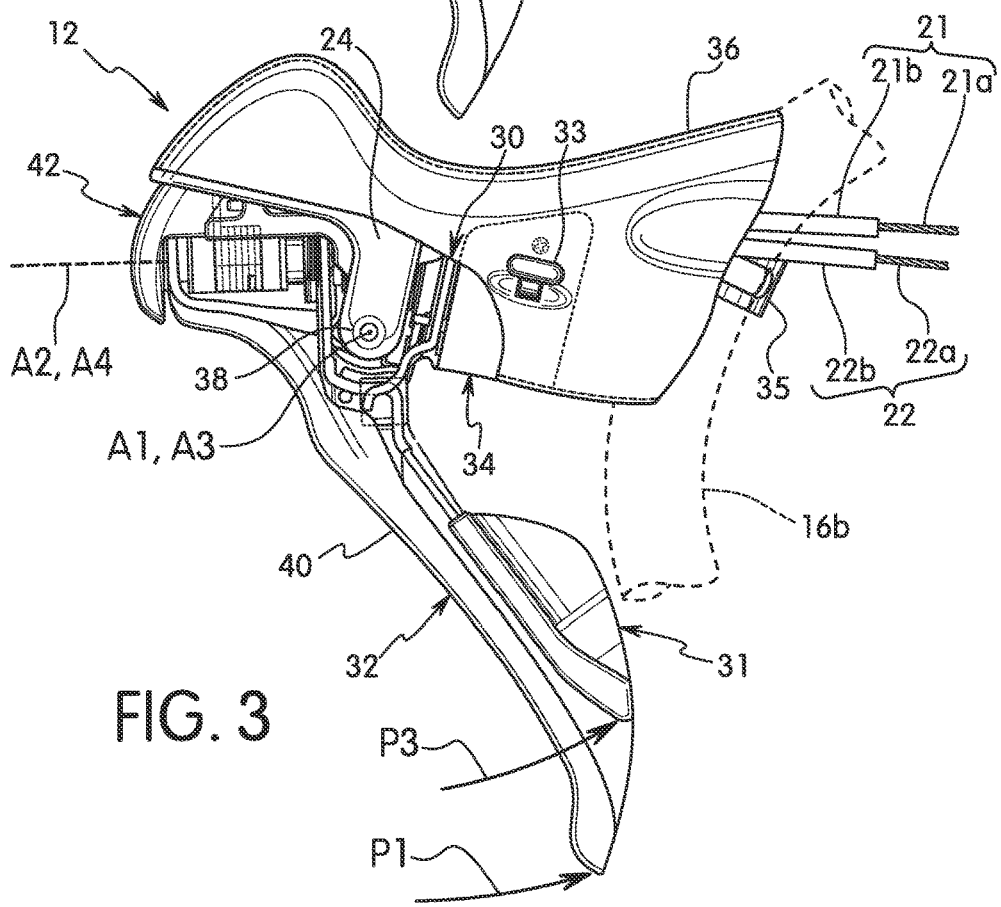
FIG. 3 is an inside elevational view of the right bicycle operating device illustrated in FIGS. 1 and 2 with the second primary (brake/shift) operating lever pivoted to a braking (operated) position.

As seen in FIGS. 2 and 3, preferably, the control cables 21 and 22 are conventional bicycle operating cables that have an outer case covering an inner wire. In other words, each of the control cables 21 and 22 are Bowden type cables basically include an inner wire slidably received within an outer case. For example, as seen in FIG. 3, the brake control cable 21 has an inner wire 21a with an outer case 21b covering the inner wire 21a, while the shift control cable 22 has an inner wire 22a with an outer case 22b covering the inner wire 22a. The inner wire 21a constitutes a connecting member that operatively connects the bicycle operating device 12 to the first brake device for applying a braking force to a wheel in response to operation of the bicycle operating device 12 as explained below. The inner wire 22a constitutes a connecting member that operatively connects the bicycle operating device 12 to the first gear shifting device for shifting the corresponding gear shifting device in response to operation of the bicycle operating device 12 as explained below.

While the bicycle operating devices 12 and 14 are illustrated as bicycle operating device that combine both shifting and braking using Bowden type cables, the bicycle operating devices 12 and 14 are not limited to a bicycle operating device that combine both shifting and braking using Bowden type cables. For example, the bicycle operating devices 12 and 14 can be configured for performing only shifting or braking. Also the bicycle operating devices 12 and 14 can be configured for performing braking using a hydraulic operating unit. Moreover, instead of using Bowden type cables for shifting, the bicycle operating devices 12 and 14 can be to operate electrical switches.

In the illustrated embodiment, as seen in FIGS. 2 and 3, the bicycle operating device 12 includes a mounting bracket 24 that houses a shift unit 30. The mounting bracket 24 is a hard rigid member that is made of a suitable material such as a hard rigid plastic material. In particular, the mounting bracket 24 constitutes a drop down handlebar bracket that includes a gripping portion that houses the shift unit 30 and provides a support for a riders hand, and a pommel portion located at a forward free end of the mounting bracket 24 and configured so that the riders hand does not slide off the forward free end of the mounting bracket 24 from the gripping portion. The gripping portion as used herein refers to the portion of the mounting bracket 24 that located rearwards of the pommel portion where the top surface begins to slop in an upward direction with the mounting bracket 24 installed on one of the downwardly curved portions 16b of the dropdown bicycle handlebar 16 in a normal use position with respect to the handlebar 16. The shift unit 30 is selectively operated by a first primary operating lever 31, a second primary operating lever 32 and a secondary operating lever 33.

As explained below, the first primary operating lever 31, the second primary operating lever 32 and the secondary operating lever 33 are examples of user (rider) operated members that are pivotally mounted relative to the mounting bracket 24. Thus, the secondary operating lever 33 can be considered to be pivotally mounted on a first shift axis, the first primary operating lever 31 can be considered to be pivotally mounted on a second shift axis, and a portion of the second primary operating lever 32 can be considered to be pivotally mounted on a third shift axis. The shift axes of the operating levers 31 to 33 will be explained in more detail below with respect to the illustrated embodiment.

In the illustrated embodiment, the secondary operating lever 33 is movably mounted on a cover member 34, which is removably attached to the mounting bracket 24 as a removable unit with respect to the mounting bracket 24. The cover member 34 constitutes a fixed member that partially covers the shift unit 30. The cover member 34 is disposed on a lateral side of the mounting bracket 24 that faces to a bicycle center plane while the bicycle operating device 12 is in an installed position. The cover member 34 forms a section of an exterior surface of the gripping portion of the mounting bracket 24. Thus, the cover member 34 is a hard rigid member that is made of a suitable material such as a hard rigid plastic material.

Figure 8:
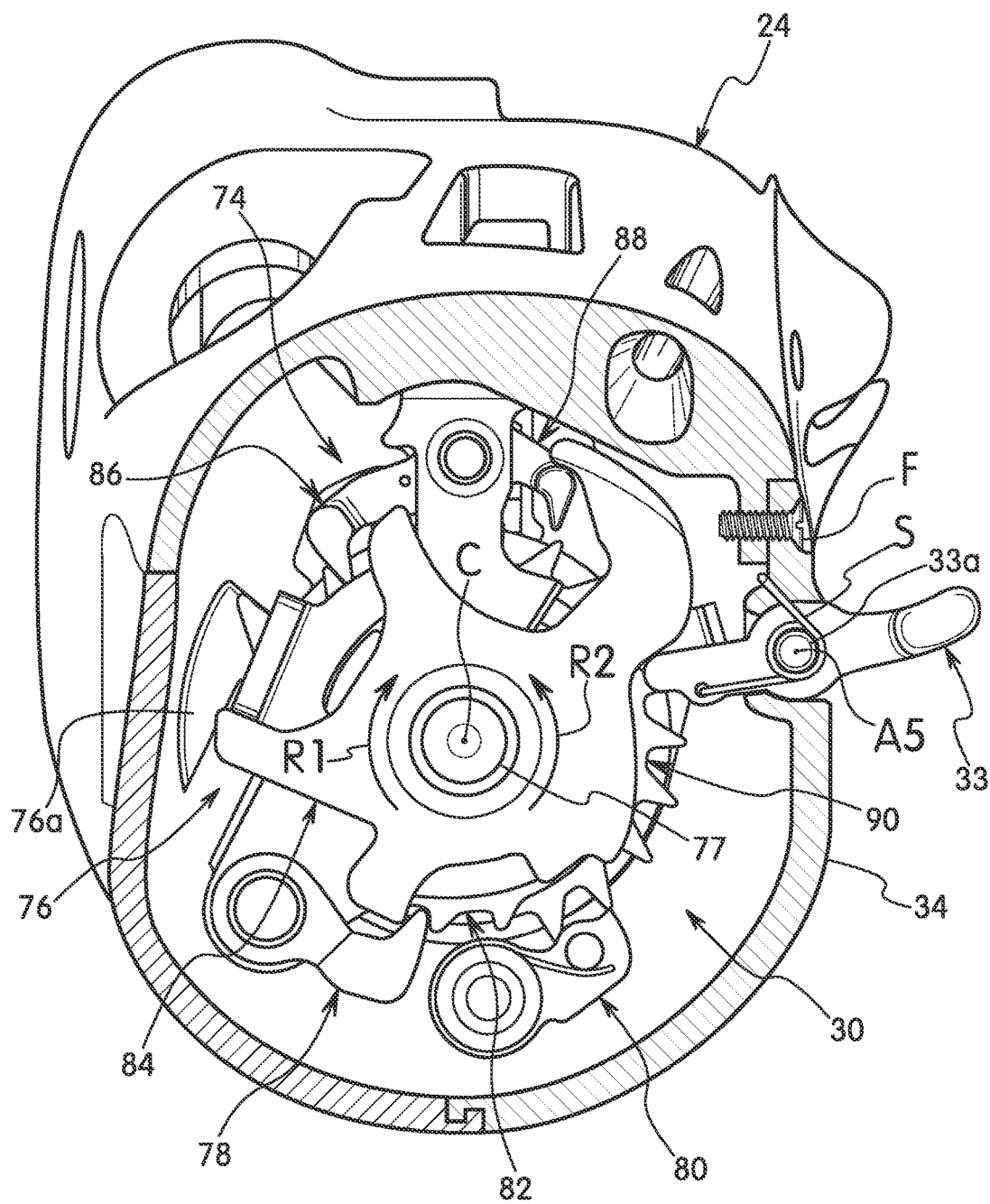
FIG. 8 is a cross sectional view of a portion of the right bicycle operating device illustrated in FIGS. 1 to 7 as seen along section line 8-8 of FIG. 2.
Figure 9:
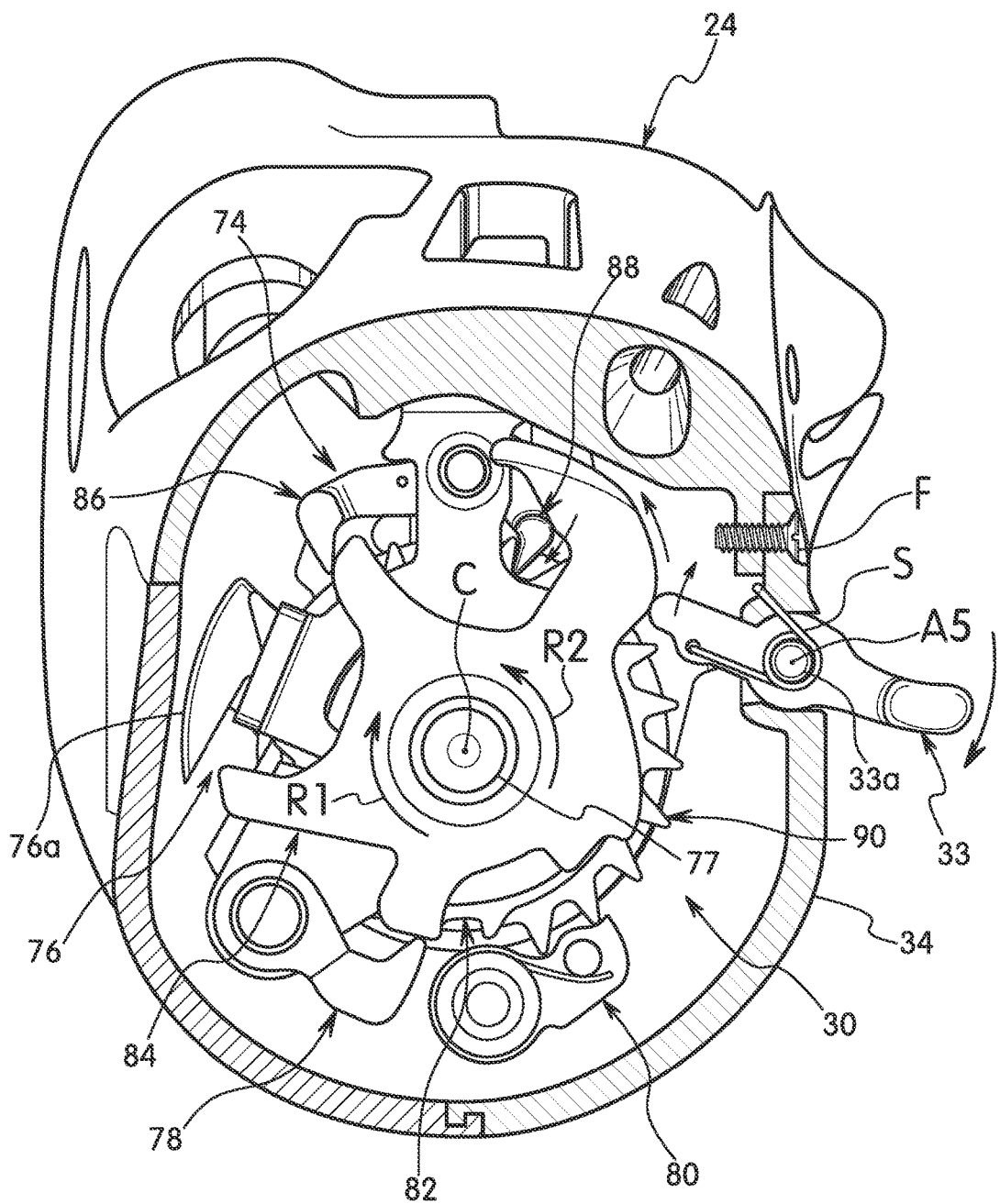
FIG. 9 is a cross sectional view, similar to FIG. 8, of a portion of the right bicycle operating device illustrated in FIGS. 1 to 8, but with the secondary operating lever pivoted to the operated position as seen in FIG. 7.

As seen in FIGS. 8 and 9, the secondary operating lever 33 is pivotally mounted on the cover member 34 by a pivot pin 33a. The pivot pin 33a can be integrally formed with the secondary operating lever 33 as a one-piece member or can be a separate member. The secondary operating lever 33 is biased to a rest position by a biasing element S. In this arrangement, a user moves a user engaging portion of the secondary operating lever 33 that projects out of the mounting bracket 24 downwardly from the rest position (FIG. 8) to the operated position (FIG. 9) for performing a shifting operation. In the illustrated embodiment, the biasing element S is a torsion spring with the coil portion disposed on the pivot pin 33a and a first free end engaged with the secondary operating lever 33 and a second free end engaged with the cover member 34. The cover member 34 is removably and reinstallably coupled to the mounting bracket 24 by a fastener F (e.g., a screw).

Figure 10:
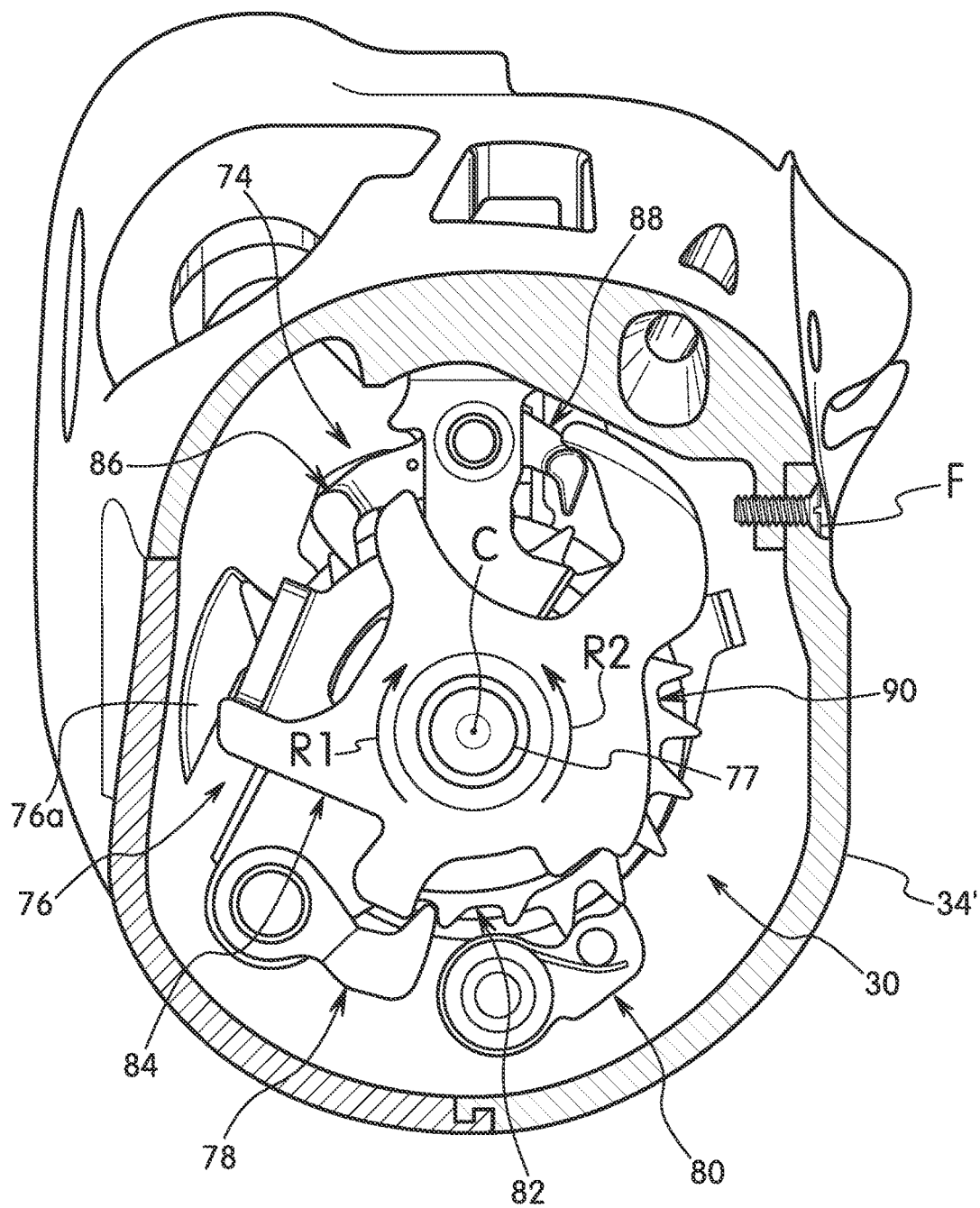
FIG. 10 is a cross sectional view, similar to FIG. 8, of a portion of the right bicycle operating device illustrated in FIGS. 1 to 9, but with the cover member having the secondary operating lever having been removed and replaced with an alternate cover member without an operating member.

As seen in FIG. 10, the cover member 34 and the secondary operating lever 33 can be removed and replaced with a cover member 34' if the rider does not want the secondary operating lever 33. Since the first primary operating lever 31 and the secondary operating lever 33 operate the shift unit 30 in the same way, the rider can still operate the shift unit 30 to release the inner wire 22a using the first primary operating lever 31 when the secondary operating lever 33 is not installed on the mounting bracket 24.

As explained below, the first primary operating lever 31 and the secondary operating lever 33 are mechanically coupled to the shift unit 30 to operate the shift unit 30 in a first shift direction. The second primary operating lever 32 is mechanically coupled to the shift unit 30 to operate the shift unit 30 in a second shift direction which is different from the first shift direction. Since the first primary operating lever 31 and the secondary operating lever 33 operate the shift unit 30 in the same shift direction, the secondary operating lever 33 is an auxiliary lever that is selectively attached in accordance with rider's preference as explained below.

In the illustrated embodiment, the first primary operating lever 31, the second primary operating lever 32 and the secondary operating lever 33 are trigger type levers that are biased to the rest positions in a conventional manner. The term "rest position" as used herein refers to a state in which the part (e.g., the first primary operating lever 31, the second primary operating lever 32 and the secondary operating lever 33) remains stationary without the need of a user holding the part in that state corresponding to the rest position. While the first primary operating lever 31, the second primary operating lever 32 and the secondary operating lever 33 are illustrated as levers that pivot with respect to the mounting bracket 24, the first primary operating lever 31, the second primary operating lever 32 and the secondary operating lever 33 can be other types of shift operating members as needed and/or desired. Thus, the first primary operating lever 31, the second primary operating lever 32 and the secondary operating lever 33 constitute examples of a first primary operating member, the second primary operating member and the operating member (secondary operating member or auxiliary operating member), respectively.

As seen in FIGS. 2 and 3, the mounting bracket 24 is provided with a handlebar clamp 35 for fixedly mounting the bicycle operating device 12. The handlebar clamp 35 constitutes a handlebar mounting structure that is at a rear end of the mounting bracket 24 for mounting to one of the downwardly curved portions 16b of the drop down handlebar 16. Thus, the mounting bracket 24 is a stationary member when mounted to the handlebar 16 by the handlebar clamp 35. Since the mounting bracket 24 is fixed to the drop down handlebar 16 by the handlebar clamp 35, the mounting bracket 24 constitutes a fixed member with respect to the drop down handlebar 16. The handlebar clamp 35 is preferably a conventional band clamp or similar structure that is used in a road shifter for gripping the drop down handlebar 16. Since the handlebar clamp 35 can be any suitable mounting structure, the handlebar clamp 35 will not be discussed or illustrated in detail herein.

In the illustrated embodiment, the shift unit 30, which is disposed an interior space or internal cavity of the mounting bracket 24. The first and second primary operating levers 31 and 32 are operatively coupled to the shift unit 30 for performing shifting operations by releasing and pulling the inner wire 22a relative to the mounting bracket 24. Referring to FIGS. 4 to 6, the movements of the first and second primary operating levers 31 and 32 are illustrated for shifting the shift unit 30. In other words, the first and second primary operating levers 31 and 32 are examples of user operated levers that are used for operating the shift unit 30 as discussed below. In particular, the first primary operating lever 31 and the second primary operating lever 32 are both operated with respect to the mounting bracket 24 to operate the shift unit 30. In the illustrated embodiment, the first primary operating lever 31 is operated relative to the mounting bracket 24 to perform a cable releasing operation, while the second primary operating lever 32 is operated relative to the mounting bracket 24 to perform a cable pulling operation.

Basically, the mounting bracket 24 constitutes a base member that basically supports the first and second primary operating levers 31 and 32 and the shift unit 30 of the bicycle operating device 12. It is desirable to provide a comfortable feeling fir the rider's hand while the rider is gripping the mounting bracket 24 made of the rigid, hard plastic material. Thus, the mounting bracket 24 has a rigid main body that is covered with a soft outer elastomeric grip cover 36. The grip cover 36 partially covers the mounting bracket 24 as seen in FIGS. 2 and 3. In particular, the grip cover 36 is stretched over a gripping portion of the mounting bracket 24. The precise construction of the mounting bracket 24 depends on the construction of the shift unit 30, which can be a variety of types such a cable operated one as shown or an electrical one (not shown). The mounting bracket 24 is sometimes formed as a one-piece member, while in other cases, the mounting bracket 24 is formed a rigid main body part and one or more panel parts. Since a variety of shift units can be used for the shift unit 30 in the bicycle operating device 12, the precise construction of the mounting bracket 24 will not be discussed herein.

Referring to FIGS. 2 to 7, the operating movements of the operating levers 31 to 33 with respect to the mounting bracket 24 will now be discussed, FIGS. 2 and 3 illustrate a braking operation being performed by the second primary operating lever 32, while FIGS. 4 to 7 illustrate shifting operations being performed by the operating levers 31 to 33. FIGS. 2 and 4 illustrate the operating levers 31 to 33 in their rest positions. FIGS. 3 and 5 illustrate the second primary operating lever 32 in an operated position.

The second primary operating lever 32 is used to perform both a braking operation (FIG. 3) and a shifting operation (e.g., a cable pulling or winding operation as seen in FIG. 5), while the first primary operating lever 31 and the secondary operating lever 33 are only used to perform a gear shifting operation (e.g., a cable releasing or unwinding operation as seen in FIGS. 6 and 7). Thus, the first primary operating lever 31 constitutes a shift operating lever (i.e., a primary release lever), while the second primary operating lever 32 constitutes a brake shift operating lever (i.e., a brake lever and a pulling lever). The secondary operating lever 33 constitutes a shift operating lever (i.e., a secondary release lever).

The second primary operating lever 32 moves the first primary operating lever 31 as the second primary operating lever 32 is operated to perform a shifting operation as seen in FIG. 5. However, the secondary operating lever 33 remains stationary as the second primary operating lever 32 is operated to perform a shilling operation as seen in FIG. 5. On the other hand, the second primary operating lever 32 and the secondary operating lever 33 both remain stationary as the first primary operating lever 31 is operated to perform a shifting operation as seen in FIG. 6. Also, the first and second primary operating levers 31 and 32 both remain stationary as the secondary operating lever 33 is operated to perform a shifting operation as seen in FIG. 7.

In the illustrated embodiment, the second primary operating lever 32 is pivotally arranged relative to the mounting bracket 24 to pivot about a first operating axis A1 (FIG. 3) between a rest position and a first operating position along a first operating path P1 (FIG. 3) for performing a braking operation. The second primary operating lever 32 is configured relative to the mounting bracket 24 such that a free end of the second primary operating lever 32 moves closer to the mounting bracket 24 as the second primary operating lever 32 pivots about the first operating axis A1 from a rest position (FIG. 2) to an operated position or a braking position (FIG. 3).

Figure 11:
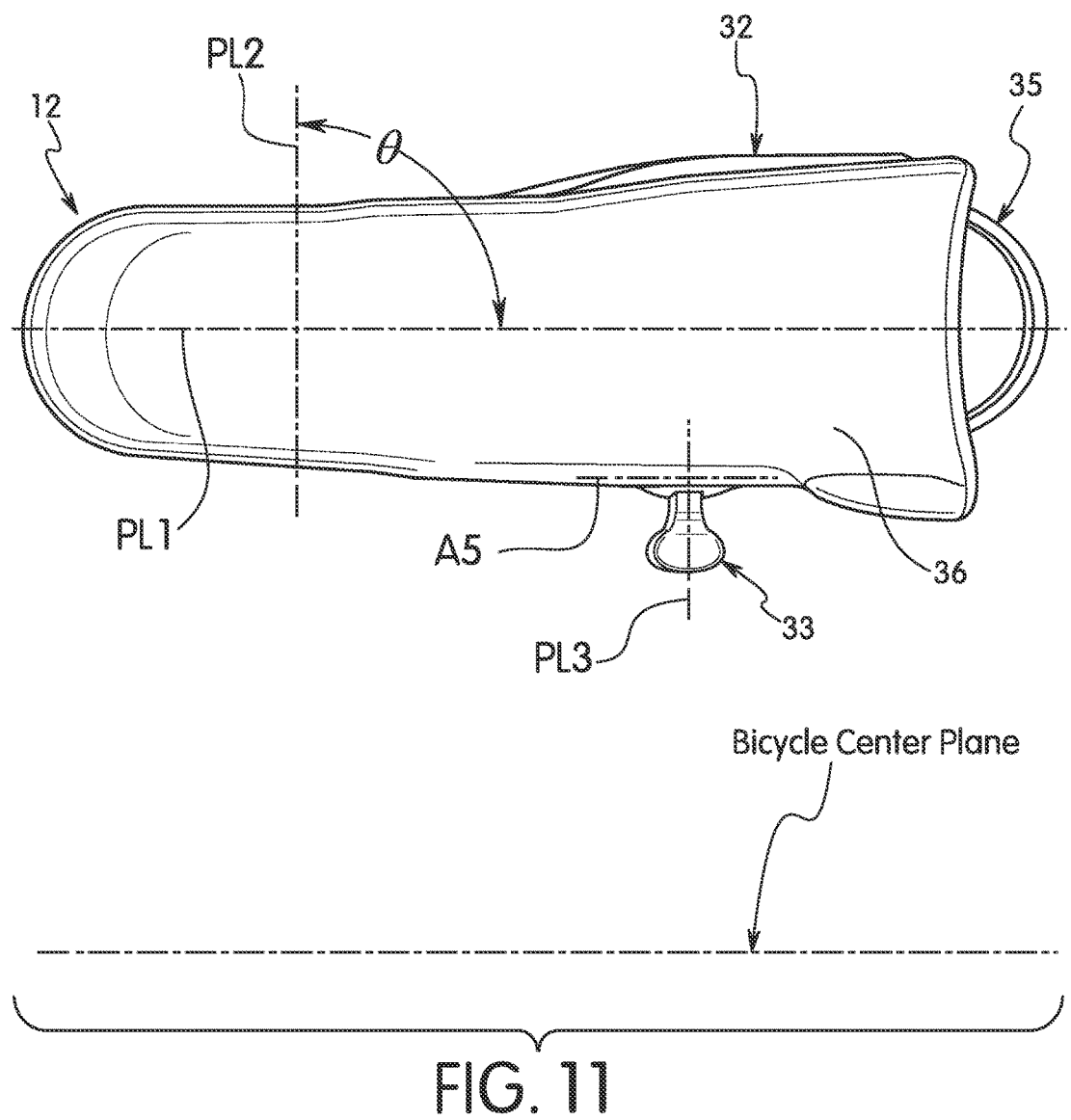
FIG. 11 is a top plan view of the right bicycle operating device illustrated in FIGS. 1 to 7 with movement planes of the shift operating levers being illustrated.

As seen in FIG. 3, the second primary operating lever 32 is pivotally mounted relative to the mounting bracket 24 by a pivot pin 38 mounted to the mounting bracket 24. The pivot pin 38 defines the first operating axis A1 that extends transverse to the lateral surfaces of the mounting bracket 24 to perform a braking operation. Thus, the first operating axis A1 constitutes a brake pivot axis, and the first operating path P1 constitutes a non-shift operating path. This pivotal movement of the second primary operating lever 32 from the rest position to the braking position along the first operating path pulls the inner wire 21a of the brake cable 21 to operate a brake device (not shown). Thus, the second primary operating lever 32 functions as a brake lever. This pivotal movement of the second primary operating lever 32 defines a first (braking) plane PL1 of the second primary operating lever 32, which is illustrated in FIG. 11 and discussed below.

In the illustrated embodiment, as seen in FIGS. 2 and 3, the second primary operating lever 32 includes a lever portion 40 and a support portion 42. The support portion 42 is pivotally attached to the mounting bracket 24 by the pivot pin 38 to pivot around the first operating axis A1. The lever portion 40 is pivotally supported on the support portion 42 around a second operating axis A2 as discussed below. The first primary operating lever 31 is pivotally mounted on the support portion 42 such that the first primary operating lever 31 is pivotally arranged relative to the mounting bracket 24 about a third operating axis A3. Thus, the first primary operating lever 31 is configured relative to the mounting bracket 24 such that a free end of the first primary operating lever 31 moves closer to the mounting bracket 24 as the first primary operating lever 31 pivots about the third operating axis A3 from the rest position (FIG. 2) to the operated position (FIG. 3). Here, in the illustrated embodiment, the first operating axis A1 of the second primary operating lever 32 corresponds to the third operating axis A3 of the first primary operating lever 31. In other words, the first and third operating axes A1 and A5 are both formed by the pivot pin 38 and thus coincident in the illustrated embodiment. Accordingly, the third operating path P3 of the first primary operating lever 31 is parallel to the first operating path P1 of the second primary operating lever 32. However, the first primary operating lever 31 could be mounted on an axis that is offset from the first operating axis A1. For example, it will be apparent from this disclosure that the second operating lever could be mounted in a manner similar to the release lever of the U.S. Pat. No. 5,400,675 to Nagano (assigned to Shimano, Inc).

As seen in FIGS. 4 and 5, the lever portion 40 of the second primary operating lever 32 is pivotally mounted relative to the mounting bracket 24 perform a shifting operation (e.g., cable pulling operation). To perform a cable operation, the lever portion 40 of the second primary operating lever 32 is pivotally arranged relative to the mounting bracket 24 to pivot about the second operating axis A2 between a rest position (FIG. 4) and a second operating position (FIG. 5) along a second operating path P2. This pivotal movement of the lever portion 40 of the second primary operating lever 32 from the rest position to the shift operated position pulls the inner wire 22a of the shift cable 22. Thus, the lever portion 40 of the second primary operating lever 32 functions as a cable pulling lever. In the illustrated embodiment, the second operating path P2 is non-parallel to the first operating path P1.

Accordingly, the lever portion 40 of the second primary operating lever 32 is operatively coupled to the shift unit 30 to operate the bicycle gear changing device to any one of a plurality of gear positions in response to pivotal movement of the lever portion 40 around the second operating axis A2. In the illustrated embodiment, the second operating axis A2 is non-parallel with respect to the first operating axis A1. Thus, the lever portion 40 of the second primary operating lever 32 pivots relative to the mounting bracket 24 along a second (shifting) plane PL2 that is transverse to the first (braking) plane PL1 of the second primary operating lever 32 as seen in FIG. 11. Specifically, the rider pivots the lever portion 40 about the second operating axis A2 in a direction towards a bicycle longitudinal center plane for shifting. On the other hand, the rider pivots the second primary operating lever 32 about the first operating axis A1 in a direction generally parallel to the bicycle longitudinal center plane for braking. When the rider pivots the second primary operating lever 32 about the first operating axis A1, the first primary operating lever 31 moves with the second primary operating lever 32 along the first (braking) plane PL1 since the first primary operating lever 31 is supported on the support portion 42. When the rider pivots the lever portion 40 of the second primary operating lever 32 about the second operating axis A2, a contact member 40a (FIG. 12) of the lever portion 40 contacts the first primary operating lever 31 such that the first primary operating lever 31 moves along with the lever portion 40 of the second primary operating lever 32 without the first primary operating lever 31 operating the shift unit 30 as explained below.

As seen in FIGS. 4 and 6, the first primary operating lever 31 is operatively coupled to the shift unit 30 for performing shifting operations (i.e., cable releasing operations). FIG. 4 illustrates the first primary operating lever 31 in the rest position, while FIG. 6 illustrates the first primary operating lever 31 in a shift operated position. In particular, the first primary operating lever 31 is pivotally mounted on the lever portion 40 of the second primary operating lever 32 such that the first primary operating lever 31 pivots relative to the second primary operating lever 32 about a fourth operating axis A4 (see FIGS. 4 and 6) between the rest position and the shifting position. However, when the rider pivots the lever portion 40 of the second primary operating lever 32 about the second operating axis A2 and the contact member 40a of the lever portion 40 moves the first primary operating lever 31, the first primary operating lever 31 moves along with the lever portion 40 of the second primary operating lever 32 without the first primary operating lever 31 operating the shift unit 30.

As seen in FIGS. 4 and 7 to 9, the secondary operating lever 33 is operatively coupled to the shift unit 30 for performing shifting operations (i.e., cable releasing operations). FIGS. 4 and 8 illustrate the secondary operating lever 33 in the rest position, while FIGS. 7 and 9 illustrate the secondary operating lever 33 in a shift operated position. In particular, the secondary operating lever 33 is pivotally mounted on the cover member 34 such that the secondary operating lever 33 pivots relative to the cover member 34 about a fifth operating axis A5 between the rest position and the shifting position. When the rider pivots the secondary operating lever 33 about the fifth operating axis A5, the first and second primary operating levers 31 and 32 remain stationary.

Accordingly, the first primary operating lever 31 is operatively coupled to the shift unit 30 to operate a bicycle gear changing device to any one of a plurality of gear positions in response to pivotal movement of the first primary operating lever 31 around the fourth axis A4. Here, in the illustrated embodiment, the second operating axis A2 of the second primary operating lever 32 corresponds to the fourth operating axis A4 of the first primary operating lever 31. In other words, the second and fourth operating axes A2 and A4 are coincident shift pivot axes, and thus, non-parallel to the third operating axis A3 of the first primary operating lever 31 in the illustrated embodiment.

In the illustrated embodiment, the first primary operating lever 31 only performs shifting operations. The second primary operating lever 32 remains stationary or at least substantially stationary as the first primary operating lever 31 is pivoted about the fourth operating axis A4 so that only the first primary operating lever 31 is performing a shifting operation. As mentioned above, the lever portion 40 of the second primary operating lever 32 contacts the first primary operating lever 31 during pivotal movement of the lever portion 40 of the second primary operating lever 32 about the second operating axis A2 to perform a gear shifting operation. However, the first primary operating lever 31 does not operate the shift unit 30 when the lever portion 40 is pivoted about the second operating axis A2 to perform a gear shifting operation. In the illustrated embodiment, the first primary operating lever 31 releases the inner wire 22a from the shift unit 30 when only the first primary operating lever 31 is pivoted about the fourth operating axis A4 in a direction towards the center longitudinal plane of the bicycle 10. Thus, the first primary operating lever 31 constitutes as a cable releasing lever.

Preferably, as seen in FIG. 11, the second primary operating lever 32 moves along the first plane PL1 as the second primary operating lever 32 is pivoted around the first operating axis A1. Also the first primary operating lever 31 moves along a second plane PL2 as the first primary operating lever 31 is pivoted around the fourth axis A4. Also the secondary operating lever 33 moves along a third (shifting) plane PL3 during a shifting operation as the secondary operating lever 33 is pivoted around the fifth operating axis A5. Preferably, the second and third (shifting) planes PL2 and PL3 are parallel or substantially parallel. The first and second planes PL1 and PL2 form an angle θ therebetween in a range of fifty degrees to ninety degrees. In the illustrated embodiment, as seen in FIG. 11, the angle θ is ninety degrees. It will be apparent from this disclosure that the first and second primary operating levers 31 and 32 are not entirely disposed within the planes PL2 and PL1, respectively. Rather, as the first and second primary operating levers 31 and 32 are pivoted around the operating axes A2 and A1, the planes PL2 and PL1 are defined by the movement of a part of each of the first and second primary operating levers 31 and 32.

Figure 12:
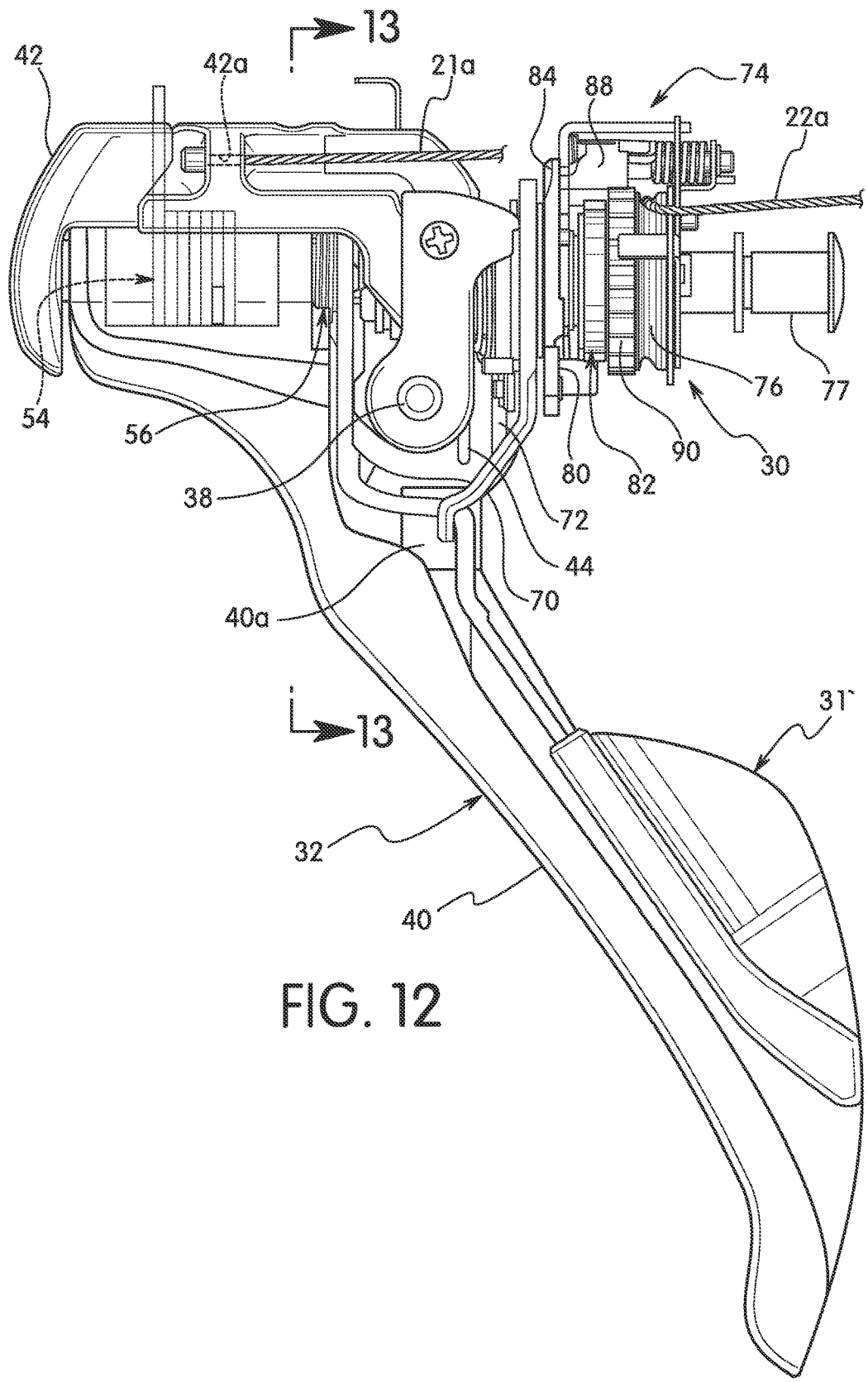
FIG. 12 is an inside elevational view of the right bicycle operating device illustrated in FIGS. 1 to 8 with selected parts (e.g., the bracket) have been removed to show the shift unit and other internal parts.
Figure 13:
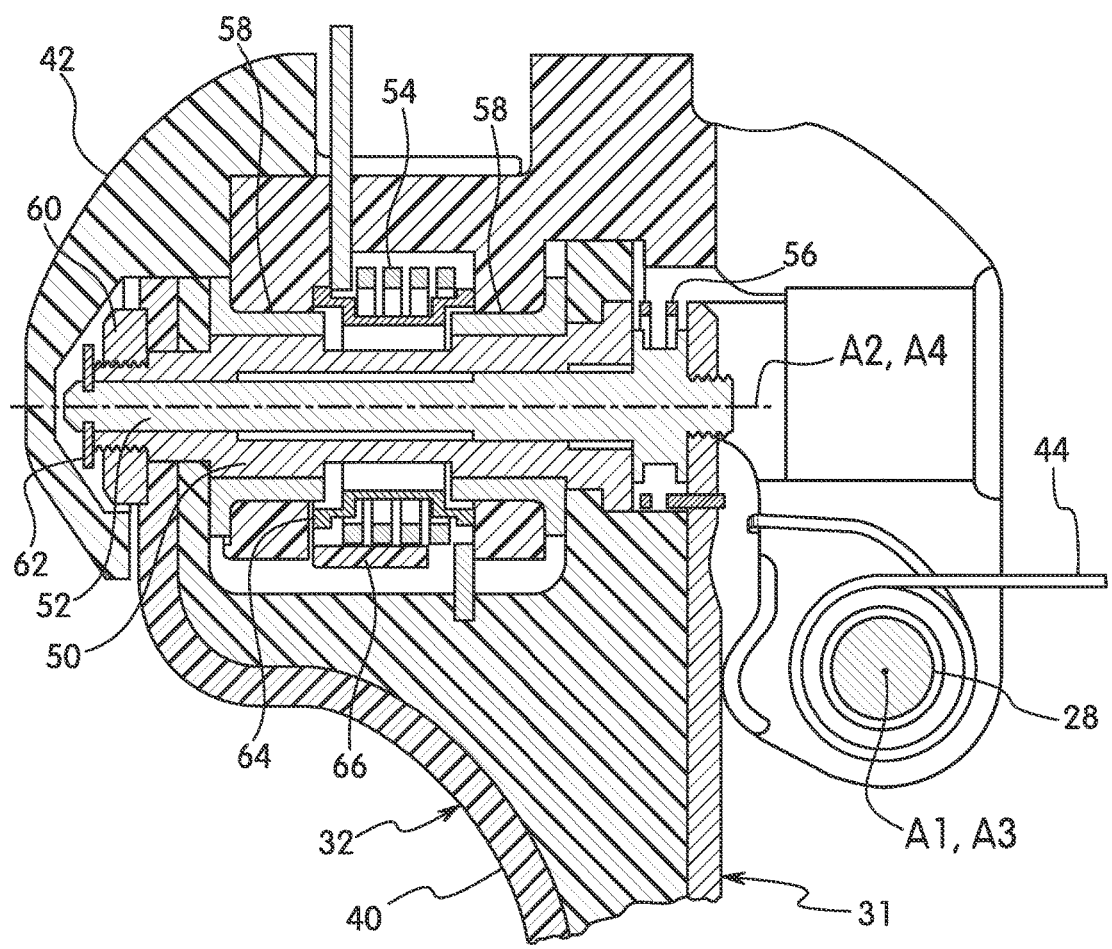
FIG. 13 is a partial cross sectional view of a portion of the right bicycle operating device illustrated in FIGS. 1 to 12 as seen along section line 13-13 of FIG. 12.

As seen in FIG. 12, the support portion 42 has a brake cable attachment structure 42a for attaching the inner wire 21a of the brake control cable 21. Thus, the brake cable attachment structure 42a pulls the inner wire 21a of the brake control cable 21 as the support portion 42 pivots about the first operating axis A1 that is defined by the pivot pin 38 from the rest position (FIG. 2) to the braking position (FIG. 3). As seen in FIG. 13, a biasing element 44 is provided on the pivot pin 38 for providing a biasing force between the mounting bracket 24 and the support portion 42. The biasing element 44 is arranged for biasing the support portion 42 and the first and second primary operating levers 31 and 32 to their rest positions (FIG. 2) in a conventional manner. In the illustrated embodiment, the biasing element 44 is a torsion spring with its coiled portion disposed on the pivot pin 38 and its first and second free ends contacting the mounting bracket 24 and the support portion 42, respectively.

Figure 14:
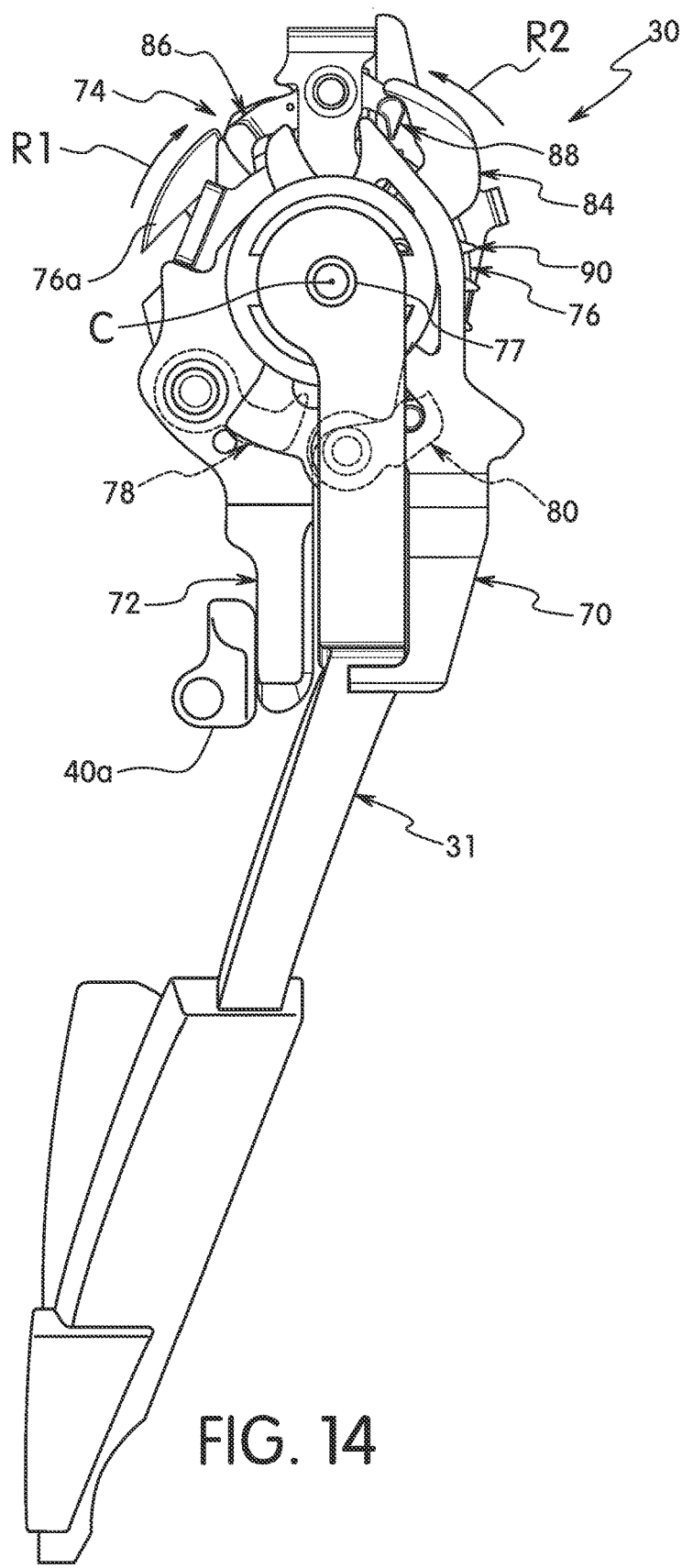
FIG. 14 is a front view of selected parts of the right bicycle operating device illustrated in FIGS. 1 to 13 as viewed along the center axis of the shift unit with the bracket removed.

As seen in FIGS. 12 to 14, the lever portion 40 is pivotally mounted to the support portion 42 on a first pivot axle 50 for pivotal movement about the second operating axis A2. In the illustrated embodiment, the second operating axis A2 corresponds to a shift pivot axis defined by the first pivot axle 50. The first primary operating lever 31 is pivotally mounted to the support portion 42 on a second pivot axle 52 for pivotal movement about the fourth operating axis A4. In the illustrated embodiment, the fourth operating axis A4 corresponds to a shift pivot axis defined by the second pivot axle 52. The second pivot axle 52 is disposed inside a center bore of a tubular shaft of the first pivot axle 50. Thus, the first and second operating axes A1 and A2 defined by the first and second pivot axles 50 and 52 are coincident in the illustrated embodiment. However, the first and second pivot axles 50 and 52 can be configured such that the first and second operating axes A1 and A2 are not coincident, if needed and/or desired.

As seen in FIG. 13, a first biasing member 54 is provided between the lever portion 40 and the support portion 42 for biasing the lever portion 40 to its rest position. The first biasing member 54 biases the lever portion 40 relative to the support portion 42 about the second operating axis A2 in a direction away from the center plane of the bicycle. In the illustrated embodiment, the first biasing member 54 is a torsion spring that is disposed on a center section of the tubular shaft of the first pivot axle 50. More specifically, the first biasing member 54 has a first end that is disposed in a hole of the lever portion 40, and a second end that is disposed in a hole of the support portion 42. The first biasing member 54 has its coiled portion disposed on the tubular shaft of the first pivot axle 50.

Similarly, as seen in FIG. 13, a second biasing member 56 is provided between the first primary operating lever 31 and the support portion 42 for biasing the first primary operating lever 31 to its rest position. The second biasing member 56 is arranged for biasing the first primary operating lever 31 relative to the second primary operating lever 32 about the fourth operating axis A4 in a direction away from the center plane of the bicycle. In the illustrated embodiment, the second biasing member 56 is a torsion spring that is disposed on a lever attachment portion of the second pivot axle 52 that extends out of one end of the tubular shaft of the first pivot axle 50. The first primary operating lever 31 is fixedly attached to the lever attachment portion such that the first (primary operating lever 31 and the second pivot axle 52 rotate as a unit within the tubular shaft of the first pivot axle 50. In the illustrated embodiment, as seen in FIG. 13, the second biasing member 56 is threaded onto the lever attachment portion 52a of the second pivot axle 52. The second biasing member 56 has a first end that is disposed in a hole of the first primary operating lever 31, and a second end that contacts the support portion 42. The second biasing element 56 has its coiled portion disposed on the lever attachment portion of the second pivot axle 52.

The first and second pivot axles 50 and 52 will now be discussed in more detail. The first pivot axle 50 is provided with a pair of bushings 58 such that the flanges of the support portion 42 pivotally supports the tubular shaft of the first pivot axle 50 via the bushings 58. Thus, the first pivot axle 50 and the lever portion 40 of the second primary operating lever 32 pivot together as a unit. In the illustrated embodiment, as seen in FIG. 13, the tubular shaft has an enlarged head at one end and an external thread at the other end. The external thread threadedly receives a nut 60. Thus, the first pivot axle 50 functions as a fastener for attaching the lever portion 40 of the second primary operating lever 32 to the support portion 42 of the second primary operating lever 32. Since the biasing element 44 biases the support portion 42 to a stationary rest position with respect to the mounting bracket 24, the first pivot axle 50 and the lever portion 40 pivot together as a unit with respect to the mounting bracket 24.

As mentioned above, the first primary operating lever 31 is attached to the second pivot axle 52, which is pivotally supported within the tubular shaft of the first pivot axle 50. The second pivot axle 52 has a free end with an annular groove for receiving a clip 62 at the end opposite to the lever attachment portion of the second pivot axle 52. The second pivot axle 52 also has an enlarged head formed adjacent the lever attachment portion of the second pivot axle 52. Thus, the second pivot axle 52 is rotatably retained to the first pivot axle 50 by the clip 62. In this way, the second pivot axle 52 is pivotally supported within the tubular shaft 50a of the first pivot axle 50 for relative pivotal movement with respect to the support portion 42 and the mounting bracket 24.

In the illustrated embodiment, as best seen in FIG. 13, the first biasing member 54 can be provided with a pair of cover members 64 and 66, if needed and/or desired. These cover members 64 and 66 aid in protecting the first biasing member 54 from contamination.

Referring now to FIGS. 12 and 14, the shift unit 30 will now be briefly discussed. However, as mentioned above, the shift unit 30 is not limited to the construction illustrated herein. Rather, the mounting arrangement of the first and second primary operating levers 31 and 32 to the mounting bracket 24 can be used with other shift units. Thus, the shift unit 30 will not be discussed in great detail. The shift unit 30 is provided in the mounting bracket 24 with a pair (first and second) of input members 70 and 72 extending out of the mounting bracket 24 for being operated by the first and second primary operating levers 31 and 32.

Specifically, the first input member 70 is operated by the movement of the first primary operating lever 31 about the fourth operating axis A4 towards the bicycle longitudinal center plane for performing a shift operation. The second input member 72 is operated by the movement of the lever portion 40 of the second primary operating lever 32 about the second operating axis A2 towards the bicycle longitudinal center plane for performing a shift operation. Thus, the primary operating levers 31 and 32 are operatively connected to the shift unit 30 by the input members 70 and 72 for performing shifting operations. The input members 70 and 72 constitute shifting members.

In the illustrated embodiment, the shift unit 30 is a cable operated unit, which typically includes a positioning mechanism 74 that controls the position of a wire take-up member or spool 76. The wire take-up member 76 constitutes one example of a winding member of the shift unit 30. Other parts of the shift unit 30 that move as the inner wire 21a moves can also constitute a winding member of the shift unit 30. The wire take-up member 76 is pivotally mounted relative to the mounting bracket 24, and has a cable attachment structure 76a for attaching a nipple of the inner wire 22a thereto. The first primary operating lever 31 and the secondary operating lever 33 both operate the shift unit 30 such that the wire take-up member 76 pivots in a first pivot (shift) direction R1 (FIG. 14), which corresponds to a cable releasing direction of the wire take-up member 76. The lever portion 40 of the second primary operating lever 32 operates the shift unit 30 such that the wire take-up member 76 pivots in a second pivot (shift) direction R2 (FIG. 14), which corresponds to a cable pulling or winding direction of the wire take-up member 76. The first pivot direction R1 is opposite the second pivot direction R2. The wire take-up member 76 and the input members 70 and 72 are coaxially arranged on a main shift axle 77 of the shift unit 30. The main shift axle 77 of the shift unit 30 defines a main pivot axis C of the shift unit 30 (FIG. 12). The main shift axle 77 of the shift unit 30 pivotally supports the wire take-up member 76 and the input members 70 and 72 to the mounting bracket 24 for rotation on the main pivot axis C by several stationary support braces or plates. The main pivot axis C of the shift unit 30 is parallel to the second and fourth operating axes A2 and A4 in the illustrated embodiment. In the illustrated embodiment, the wire take-up member 76 is biased in the first pivot direction R1 (FIG. 12) by a biasing element such as a coil torsion spring having one end attached to the wire take-up member 76 and the other end attached to one of the stationary support plates.

In the illustrated embodiment, the input member 72 has a putting pawl 78 that is configured and arranged to operate the positioning mechanism 74 such that the wire take-up member 76 pivots in the second pivot direction R2. Thus, operation of the lever portion 40 of the second primary operating lever 32 causes the wire take-up member 76 to move in the second pivot direction R2 by the pulling pawl 78 operating the positioning mechanism 74 for pulling the inner wire 22a. On the other hand, the input member 70 has a release pawl 80 that is configured and arranged to operate the positioning mechanism 74 such that the wire take-up member 76 pivots in the first pivot direction R1. Thus, operation of the first primary operating lever 31 causes the wire take-up member 76 to move in the first pivot direction R1 by the release pawl 80 operating the positioning mechanism 74 for releasing the inner wire 22a.

Figure 15:
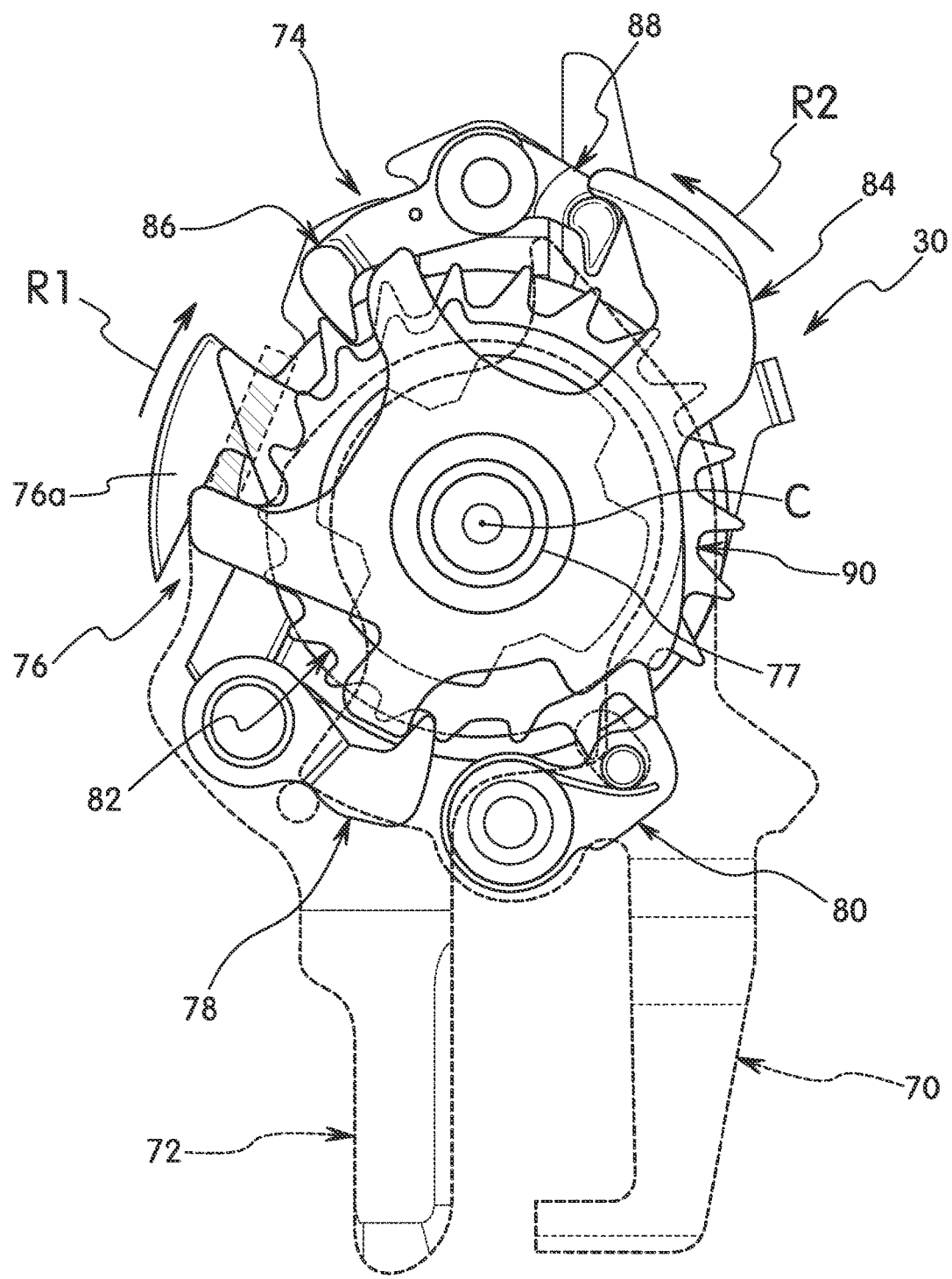
FIG. 15 is a front view of selected parts of the shift unit for the right bicycle operating device illustrated in FIGS. 1 to 13 as viewed along the center axis of the main shift unit axle, with the input members of the shift operating levers in their rest positions.
Figure 16:
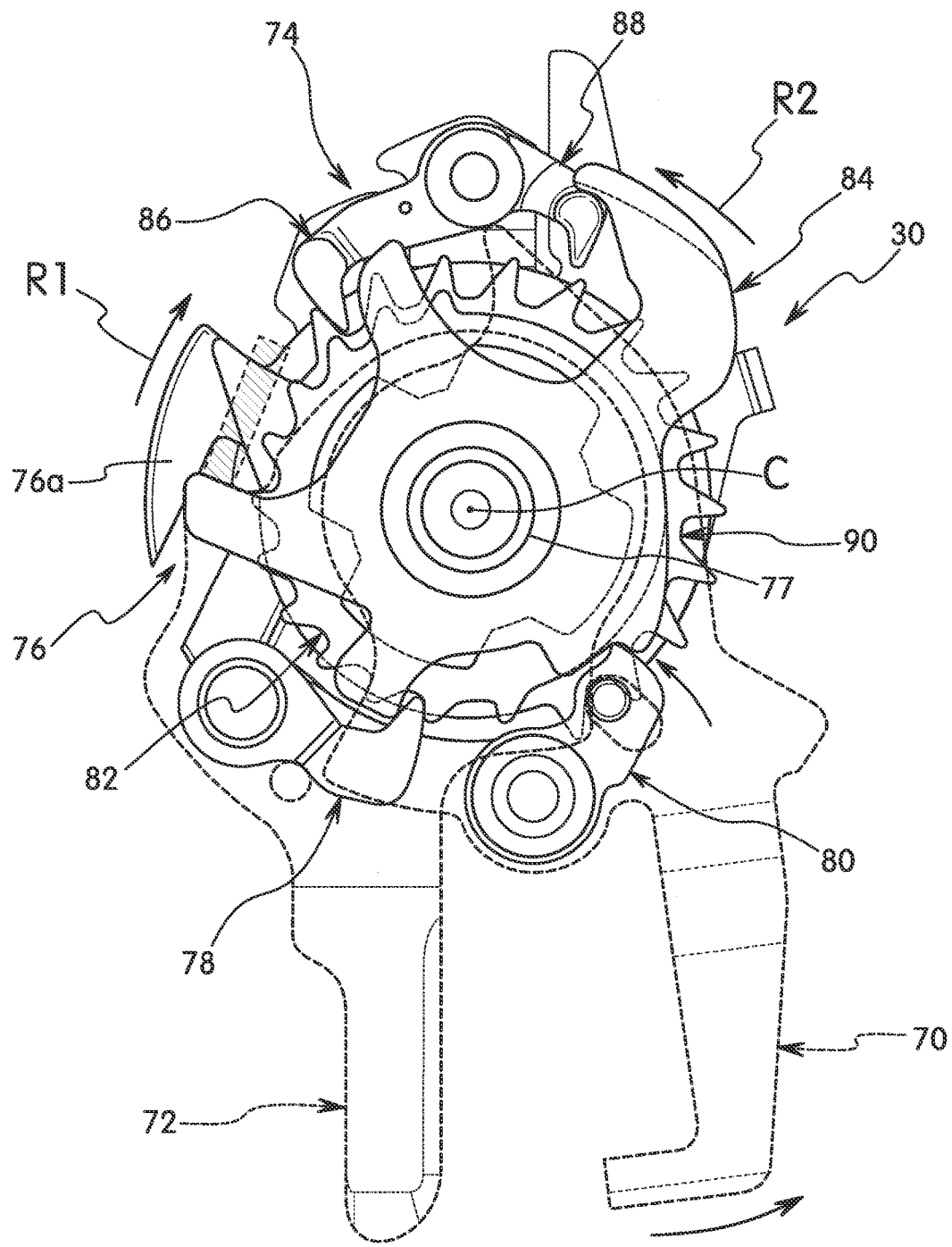
FIG. 16 is a front view of the selected parts of the shift unit illustrated in FIG. 15, but with the input member of the first primary (release) operating lever being rotated from the rest position of FIG. 15 to start performing a shifting operation that releases the inner wire of the control cable.

In the illustrated embodiment, as seen in FIG. 15, the positioning mechanism 74 has a pulling ratchet or plate 82, a release plate 84, a positioning pawl 86, a stop pawl 88 and a positioning ratchet or plate 90. The pulling plate 82 and the positioning plate 90 are fixed to the wire take-up member 76 such that they move together as a unit. The pulling plate 82 includes a plurality of winding teeth that are selectively engaged by the pulling pawl 78 to pivot the wire take-up member 76 in the second pivot direction R2. The positioning plate 90 includes a plurality of positioning teeth that are selectively engaged by the positioning pawl 86 to hold the wire take-up member 76 in a shifted position after the first and second primary operating levers 31 and 32 are operated and released. The release plate 84 is rotated by either the secondary operating lever 33 or the release pawl 80 in the second pivot direction R2 such that the positioning pawl 86 and the stop pawl 88 are selectively engaged and disengaged from the positioning plate 82 to release the positioning plate 90 for movement in the first pivot direction R1. Thus, the second pivot direction R2 also corresponds to a releasing direction of the release plate 84. The release plate 84 is one example of a release member that is selectively moved by the secondary operating lever 33 and the release pawl 80 to operate the shift unit for permitting the wire take-up member 76 to pivot in the first pivot direction R1.

In the illustrated embodiment, as seen in FIGS. 8 and 9, the secondary operating lever 33 is pivotally mounted to the cover member 34 on the fifth operating axis A5, which is parallel to the main pivot axis C, which is also the pivot axis of the release plate 84 (i.e., the release member). In other words, the secondary operating lever 33 is pivotally mounted on the cover member 34 about a first axis (i.e., the fifth operating axis A5) and the release plate 84 (i.e., the release member) is pivotally mounted relative to the mounting bracket 24. In the illustrated embodiment, the second axis (i.e., the main pivot axis C) of the release plate 84 (i.e., the release member) is parallel to the first axis (i.e., the fifth operating axis A5) of the secondary operating lever 33. According, with this arrangement, the release plate 84 (i.e., the release member) pivots toward a releasing direction of the release plate 84 as the secondary operating lever 33 pivots toward an operating direction of the secondary operating lever 33, the operating direction being opposite to the releasing direction (the second pivot direction R2) as viewed in a direction parallel to the first and second axes (i.e., as viewed from the front of the bicycle operating device 12 and looking parallel to the main pivot axis C and the fifth operating axis A5. On the other hand, the wire take-up member 76 (i.e., the winding member) pivots toward the first shift direction (the first pivot direction R1) as the secondary operating lever 33 pivots from the rest position toward the operating direction. The operating direction of the secondary operating lever 33 is opposite to the first shift direction (the first pivot direction R1) of the wire take-up member 76 (i.e., the winding member) as viewed in a direction parallel to the fifth operating axis A5 and the main pivot axis C.

In the illustrated embodiment, the pulling pawl 78 is biased by a biasing element, such as a torsion spring, towards engagement with the winding teeth of the pulling plate 82 as seen in the rest position of FIG. 12. Thus, during a winding operation, the lever portion 40 of the second primary operating lever 32 is pivoted about the second operating axis A2. This movement of the lever portion 40 causes the pulling pawl 78 to engage one of the winding teeth of the pulling plate 82, and thus, rotate the pulling plate 82 in the second pivot direction R2. The rotation of the pulling plate 82 in the second pivot direction R2 causes the positioning plate 90 to rotate therewith as a unit. As the positioning plate 90 rotates in the second pivot direction R2, the positioning teeth of the positioning plate 90 move the positioning pawl 86 in and out of engagement with the positioning teeth of the positioning plate 90. In this way, a ratcheting action occurs between the positioning teeth of the positioning plate 90 and the positioning pawl 86 to change the gear shift position of the wire take-up member 76. In other words, the positioning pawl 86 engages a different one of the positioning teeth of the positioning plate 90 to selectively hold the wire take-up member 76 in a new gear shift position.

During a winding operation with the lever portion 40 of the second primary operating lever 32, the first and second primary operating levers 31 and 32 are configured to cooperate together with the release pawl 80 such that the release pawl 80 is held in a disengaged position with respect to the release plate 84. In this way, when the rider pivots the lever portion 40 of the second primary operating lever 32 about the second operating axis A2, the abutment 40a of the lever portion 40 moves the input member 72 which in turn abuts against the input member 70 to move the input member 70. The movement of the input member 72 by the lever portion 40 results in the first primary operating lever 31 pivoting about the fourth operating axis A4 without the first primary operating lever 31 operating the shift unit 30 because an abutment of the input member 70 prevents the release pawl 80 from engaging the shift unit 30.

In the illustrated embodiment, the release pawl 80 is biased by a biasing element, such as a torsion spring, towards engagement with the release plate 84 as seen in the rest position of FIG. 12. During a releasing operation with the first primary operating lever 31 pivoting about the fourth operating axis A4, the release plate 84 moves the pulling pawl 78 to a disengaged position with respect to the pulling plate 82. In this way, the release plate 84 is free to rotate in the second pivot direction R2 without moving the input member 72 and the lever portion 40. Rotation of the release plate 84 in the second pivot direction R2 sequentially operates the stop pawl 88 and then the positioning pawl 86 so that the wire take-up member 76 rotates in the first pivot direction R1 by a biasing force of a biasing element for one shift position.

Referring now to FIGS. 15 to 19, a shift operation of the shift unit 30 will now be discussed for performing a cable releasing operation in which the wire take-up member 76 is shifted one shift position in the first pivot direction R1. As mentioned above, both the first primary operating lever 31 and the secondary operating lever 33 pivot the release plate 84 (i.e., the release member) toward the releasing direction (the second pivot direction R2) to shift the wire take-up member 76 one shift position in the first pivot direction R1. Since the operation of the release plate 84 for operating the shift unit 30 is identical for the first primary operating lever 31 and the secondary operating lever 33, only the operation of the shift unit 30 by the first primary operating lever 31 will be shown for the sake of brevity.

Cable releasing operations of the shift unit 30 are performed by the rider pivotally moving the first primary operating lever 31 about the fourth operating axis A4 in the lateral inward direction towards the bicycle longitudinal center plane (or by the rider pivotally moving the secondary operating lever 33 about the fifth operating axis A5 in a downward direction). The first primary operating lever 31 is operated in a single progressive movement from the rest position of FIG. 15 to the fully operated position of FIG. 18) such that in the first input member 70 moves in a single progressive movement in the second pivot direction R2 to shift the wire take-up member 76 from a current shift position to the next adjacent shift position.

Figure 18:
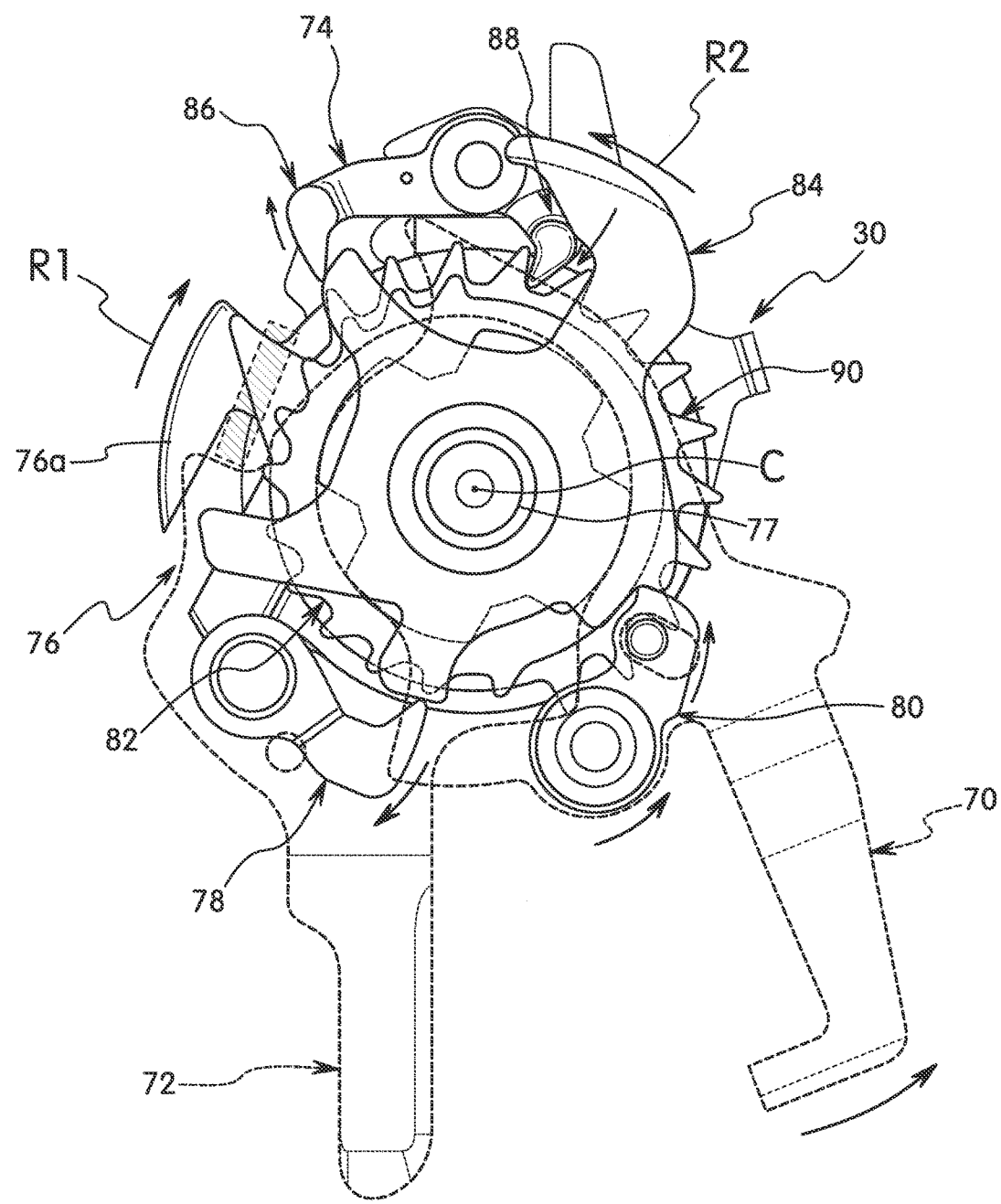
FIG. 18 is a front view of the selected parts of the shift unit illustrated in FIGS. 15 to 17, but with the input member of the first primary (release) operating lever being rotated farther to rotate the release plate farther and move the positioning pawl completely out of the path of the positioning teeth.

As seen in FIG. 15, the shift unit 30 is held in the rest position by the positioning pawl 86 contacting one of the positioning teeth of the positioning plate 90. When the rider pivots the first primary operating lever 31, this pivotal movement of the first primary operating lever 31 is transmitted to the first input member 70 by the first primary operating lever 31 contacting and pushing the first input member 70 such that the first input member 70 is rotated in the second pivot direction R2 from its rest position (FIGS. 15 and 16) to its releasing position (FIG. 18).

Figure 17:
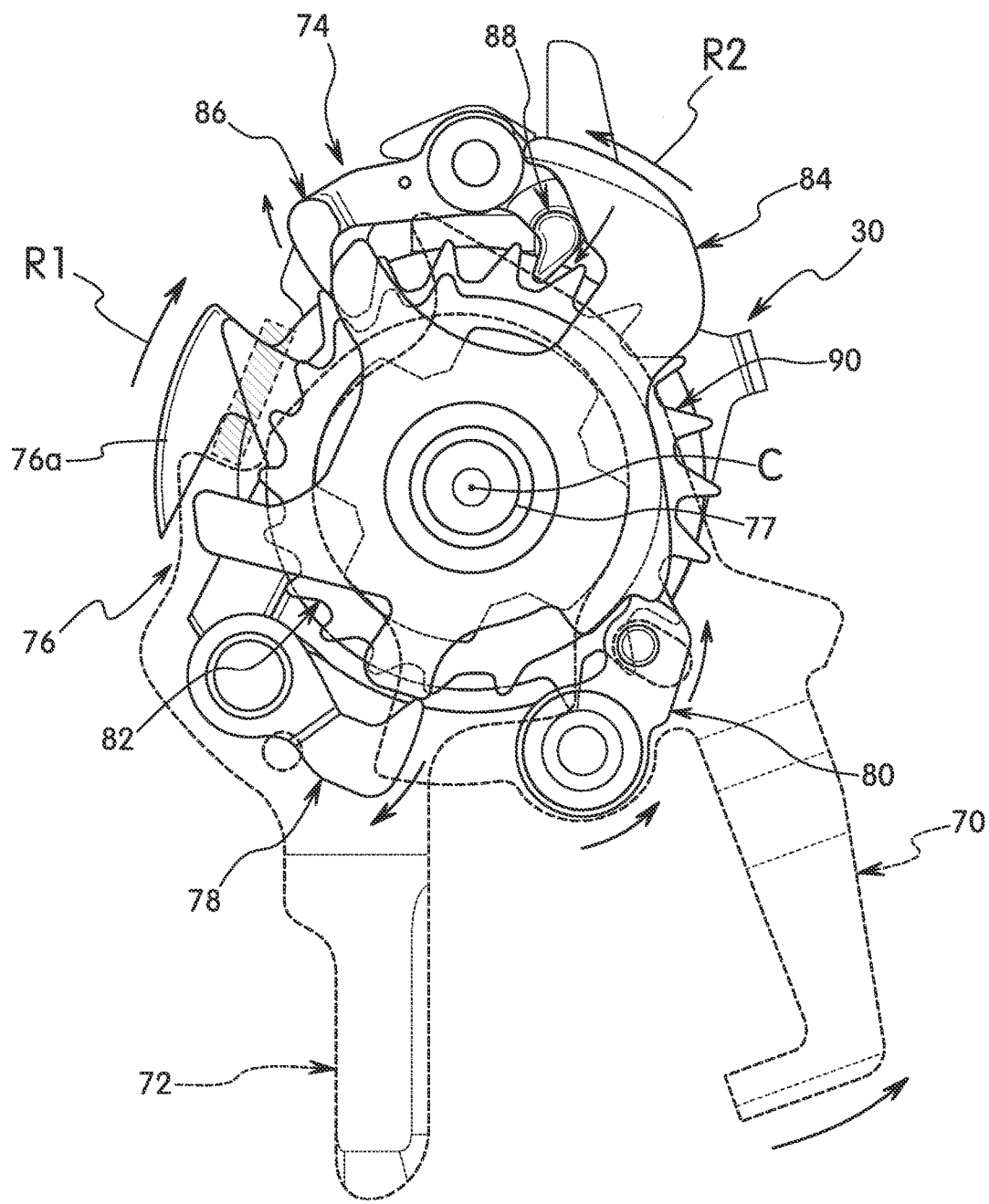
FIG. 17 is a front view of the selected parts of the shift unit illustrated in FIGS. 15 and 16, but with the input member of the first primary (release) operating lever being rotated farther to rotate the release plate, move the stopping pawl into the path of the positioning teeth and start moving the positioning pawl out of the path of the positioning teeth.
Figure 19:
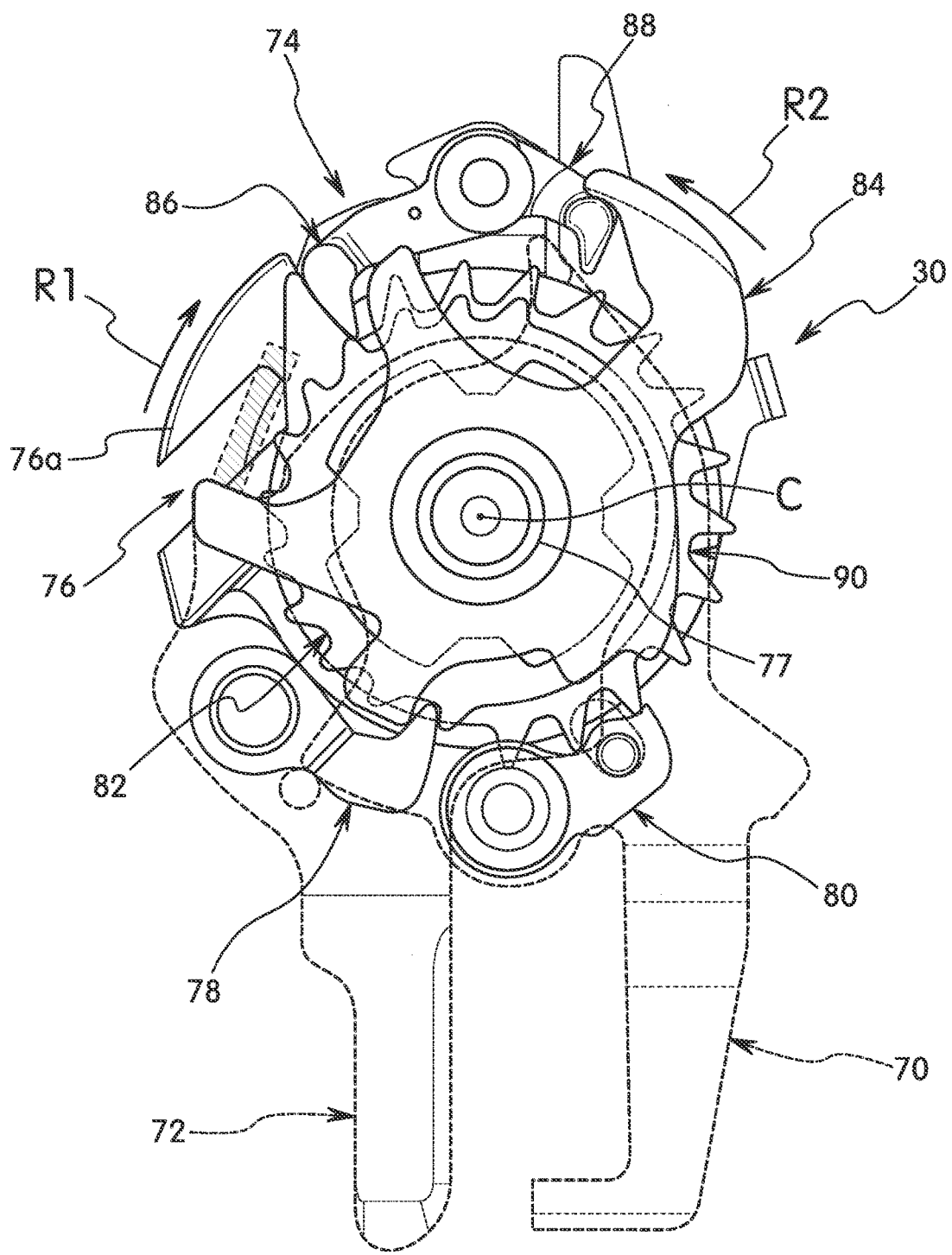
FIG. 19 is a front view of the selected parts of the shift unit illustrated in FIGS. 15 to 18, but with the input member of the first primary (release) operating lever being rotated from the shift operated position of FIG. 18 back to the rest position.
Figure 20:
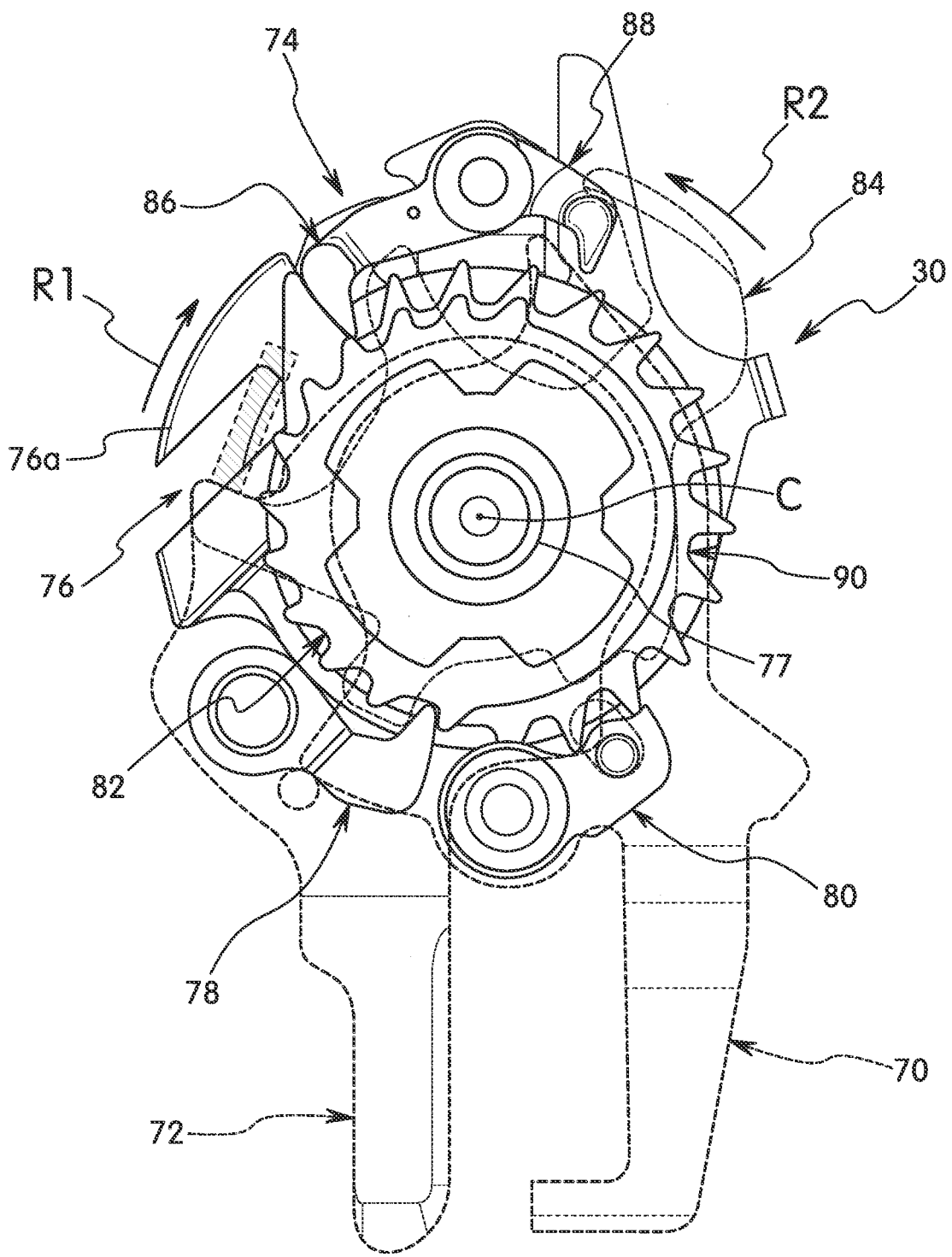
FIG. 20 is a front view of selected parts of the shift unit for the right bicycle operating device illustrated in FIGS. 1 to 13 as viewed along the center axis of the main shift unit axle, with the input members of the shift operating levers in their rest positions.
Figure 21:
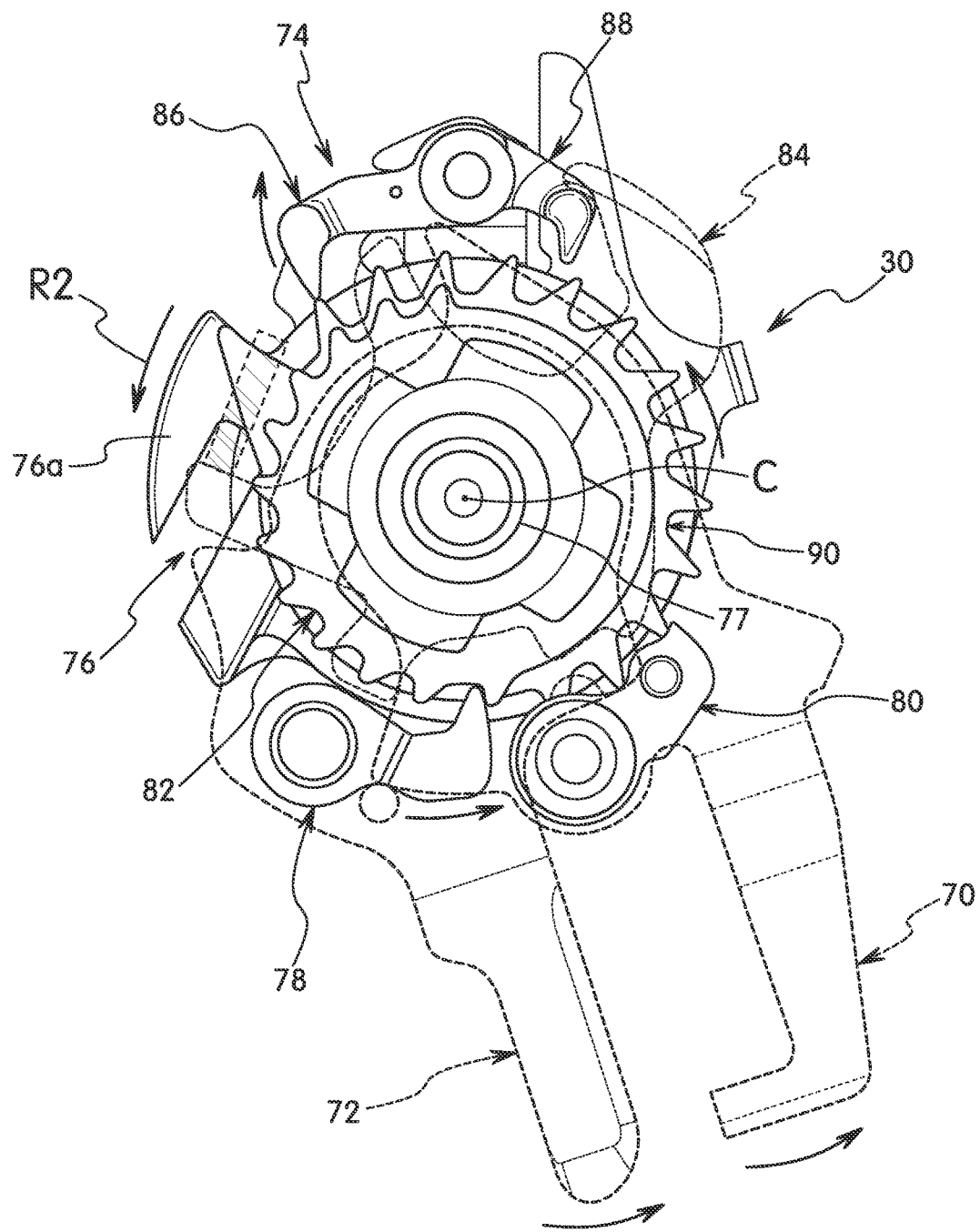
FIG. 21 is a front view of the selected parts of the shift unit illustrated in FIG. 20, but with the input member of the second primary (brake/shift) operating lever being rotated from the rest position of FIG. 20 to start a shifting operation that pulls the inner wire of the control cable.

As the first input member 70 pivots in the second pivot direction R2 during a cable releasing operation of the shift unit 30, the release pawl 80 engages an operating tooth or abutment of the release plate 84 to move the release plate 84 in response to the movement of the first input member 70. This movement of the release plate 84 first causes a first pawl operating projection to pivot the stop pawl 88 towards the positioning plate 90 and a second pawl operating projection to pivot the pulling pawl 78 out of engagement with the positioning plate 90 as seen in FIG. 17. Further movement of the release plate 84 also causes a third pawl operating projection to pivot the positioning pawl 86 away from the positioning plate 90 and out of engagement with one of the positioning teeth 78a of the positioning plate 90 as seen in FIG. 18. As a result, the wire take-up member 76, the pulling plate 82 and the positioning plate 90 rotate in the first pivot direction R1 under the force of a biasing element (not shown). However, the stop pawl 88 engages one of the positioning teeth of the positioning plate 90 to stop the rotation of the wire take-up member 76, the pulling plate 82 and the positioning plate 90 such that the wire take-up member 76 is held in an intermediate shift position. Then upon releasing the first input member 70, the release plate 84 releases the positioning pawl 86 so that the positioning pawl 86 moves back into the path of the positioning teeth. Then the stop pawl 88 subsequently moves out of the path of the positioning teeth. Thus, the stop pawl 88 releases the positioning plate 90 after the positioning pawl 86 has moved back into the path of the positioning teeth as seen in FIG. 19. In this way, the stop pawl 88 releases the positioning plate 90 so that the positioning pawl 86 engages one of the positioning teeth to stop rotation of the positioning plate 90 in the first pivot direction R1.

Referring now to FIGS. 20 to 23, a shift operation of the shift unit 30 will now be discussed for performing a cable pulling operation in which the wire take-up member 76 is shifted one shift position in the second pivot direction R2. Cable pulling operations of the shift unit 30 are performed by the rider pivotally moving the lever portion 40 of the second primary operating lever 32 about the second operating axes A2 in the lateral inward direction towards the bicycle longitudinal center plane. The lever portion 40 of the second primary operating lever 32 is operated in a single progressive movement such that the second input member 72 moves in a single progressive movement in the second pivot direction R2 from a current shift positions to the next adjacent shift position. The shift unit 30 and the second input member 72 are configured such that multiple shifts can be performed in the cable pulling direction (the second pivot direction R2) by moving the second input member 72 farther in the second pivot direction R2.

Figure 22:
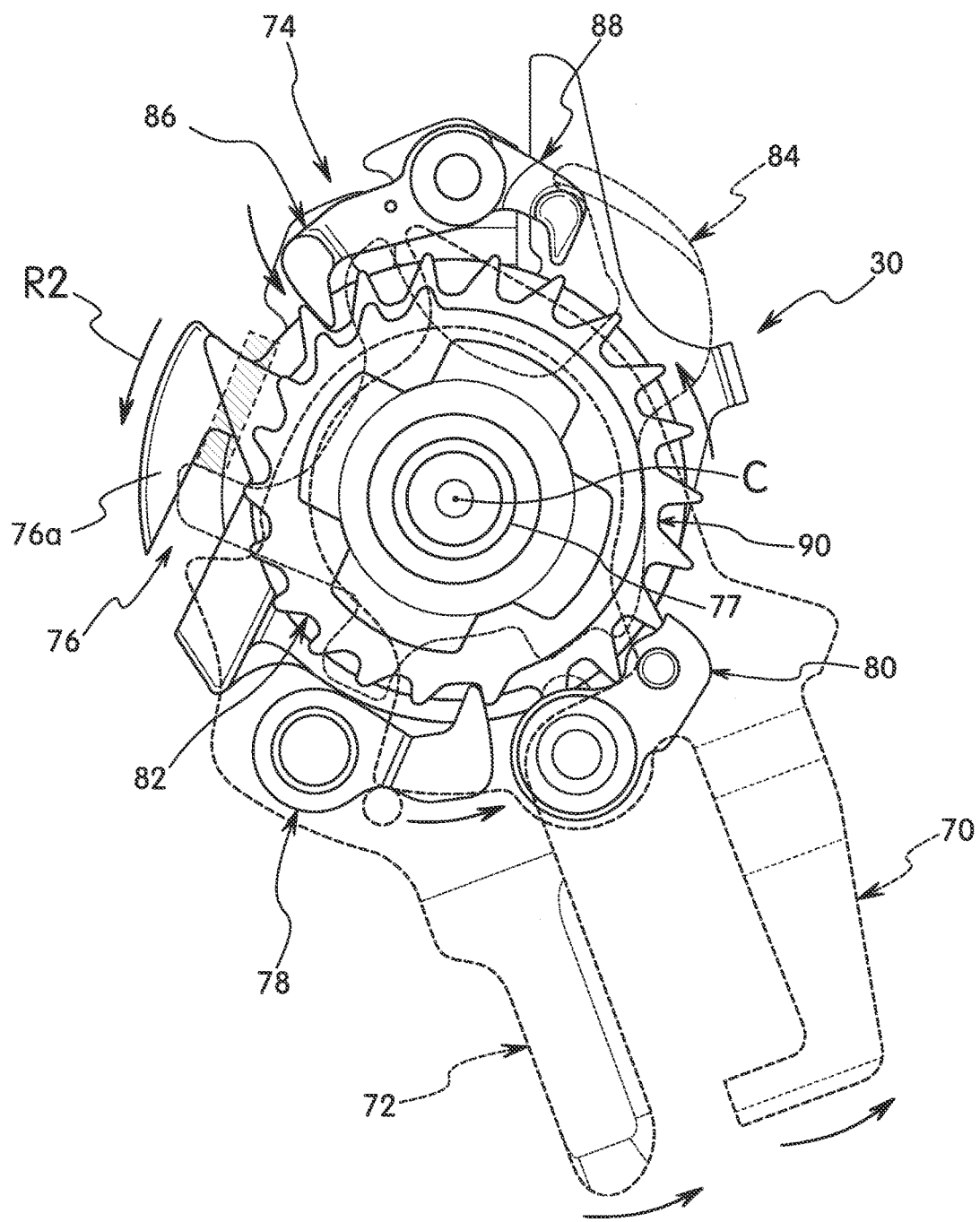
FIG. 22 is a front view of the selected parts of the shift unit illustrated in FIGS. 20 and 21, but with the input member of the second primary (brake/shift) operating lever being rotated farther from the position of FIG. 21 to a shift operated position such that the positioning pawl engages the next adjacent positioning tooth in a clockwise direction as seen in FIGS. 20 and 21 to perform a shifting operation.
Figure 23:
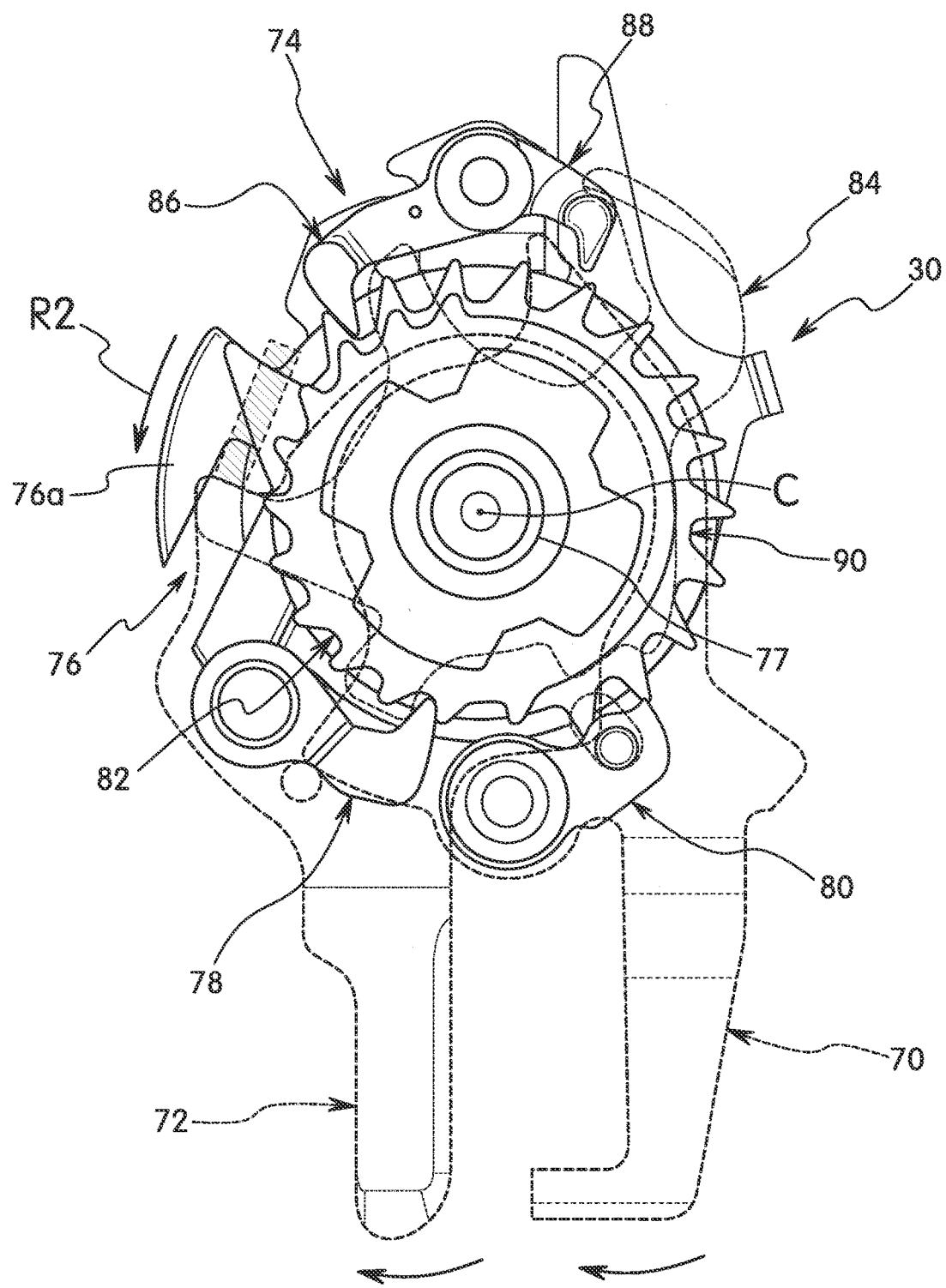
FIG. 23 is a front view of the selected parts of the shift unit illustrated in FIGS. 21 and 22, but with the input member of the second primary (brake/shift) operating lever being rotated back from the shift operated position of FIG. 22 to the rest position of FIG. 20 after the shift unit has been changed by one shift position.

As mentioned above, a cable pulling or winding operation of the shift unit 30 is performed by the rider pivotally moving the lever portion 40 of the second primary operating lever 32. This pivotal movement of the lever portion 40 is transmitted to the second input member 72 such that the second input member 72 is rotated in the second pivot direction R2 from its rest position (FIG. 20) to its shifting position (FIG. 22). As the second input member 72 rotates in the second pivot direction R2, the second input member 72 contacts the release pawl 80 so that the first and second input members 70 and 72 move together. As the second input member 72 rotates in the second pivot direction R2, the pulling pawl 78 engages and pulls one of the pull teeth of the pulling plate 82. This engagement of the pulling pawl 78 with one of the pull teeth causes the pulling plate 82 to rotate in the second pivot direction R2. Rotation of the pulling plate 82 also results in the wire take-up member 76 and the positioning plate 90 to rotate together since they are all fixed together as a unit in the illustrated embodiment. Thus, the rotation of the positioning plate 90 results in the positioning pawl 86 moving out of engagement with one of the positioning teeth and then engaging another one of the positioning teeth to hold the wire take-up member 76 in the next desired shift position. When the lever portion 40 of the second primary operating lever 32 is released from the shifting position of FIG. 22, the first and second input members 70 and 72 return to their rest positions as seen in FIG. 23 and the positioning plate 90 is engaged with the positioning pawl 86 to maintain the wire take-up member 76 in the new shift position.

A single shift can be performed in a single progressive movement of the lever portion 40 of the second primary operating lever 32. This single shift is accomplished by moving the lever portion 40 by a first amount, and then releasing the lever portion 40 of the second primary operating lever 32 as seen in FIGS. 20 to 23. Alternatively, by moving the lever portion 40 by a second amount that is greater than the first amount from the rest position, and then releasing the lever portion 40, a multiple shift can be perform with a single progressive movement of the lever portion 40 of the second primary operating lever 32.

In understanding the scope of the present invention, the term "comprising" and its derivatives, as used herein, are intended to be open ended terms that specify the presence of the stated features, elements, components, groups, and/or integers, but do not exclude the presence of other unstated features, elements, components, groups, and/or integers. The foregoing also applies to words having similar meanings such as the terms, "including", "having" and their derivatives. As used herein to describe the above embodiment(s), the following directional terms "forward", "rearward", "top", "bottom", "above", "below", "downward", "vertical", "horizontal", "inner", "outer" and "transverse" as well as any other similar directional terms refer to those directions of a bicycle equipped with the bicycle operating device on a flat horizontal surface. Accordingly, these terms, as utilized to describe the bicycle operating device should be interpreted relative to a bicycle equipped with the bicycle operating device as used in the normal riding position on a flat horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, while a lever adjustment arrangement is illustrated for adjusting a rest position of lever of a road bicycle operating device, it will be apparent to those skilled in the art from this disclosure that that the lever adjustment arrangement can be adapted to a mountain bicycle operating device such as the one disclosed in U.S. Pat. No. 8,181,553 (assigned to Shimano Inc.). Moreover, while the second primary operating lever 32 is illustrated as a cable operated brake lever, it will be apparent to those skilled in the art from this disclosure that that the second primary operating lever 32 can be modified to operate a hydraulic braking system. In other words, one or both of the bicycle operating devices 12 and 14 can be modified such that the invention is applied to a shift operating device having a hydraulic braking system.

Components that are shown directly connected or contacting each other can have intermediate structures disposed between them unless specifically stated otherwise. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle shift operating device comprising:
   a mounting bracket;
   a shift unit disposed in the mounting bracket;
   an attachment member removably attached to the mounting bracket and being a cover member at least partially covering the shift unit;
   an operating member pivotally mounted on the attachment member about a first axis, the operating member being mechanically coupled to the shift unit to operate the shift unit while the attachment member is attached to the mounting bracket, the operating member being mechanically disengaged from the shift unit while the attachment member is removed from the mounting bracket; and
   a first primary operating member mechanically coupled to the shift unit to operate the shift unit, the operating member and the first primary operating member operating the shift unit in a first shift direction.

2. The bicycle shift operating device according to claim 1, wherein
   the shift unit includes a winding member operatively pivoted by the operating member around a pivot axis.

3. The bicycle shift operating device according to claim 2, wherein
   the pivot axis of the winding member is parallel to the first axis of the operating member.

4. The bicycle shift operating device according to claim 3, wherein
   the winding member pivots toward a first shift direction as the operating member pivots toward an operating direction, the operating direction of the operating member being the same as the first shift direction of the winding member as viewed in a direction parallel to the first axis and the pivot axis.

5. The bicycle shift operating device according to claim 1, wherein
   the cover member is disposed on a lateral side of the mounting bracket that faces to a bicycle center plane while the bicycle shift operating device is in an installed position.

6. The bicycle shift operating device according to claim 1, further comprising
   a second primary operating member including a brake cable attachment structure that pulls a brake cable as the second primary operating member is pivoted from a rest position to a braking position about a braking axis.

7. The bicycle shift operating device according to claim 6, wherein
   the second primary operating member is mechanically coupled to the shift unit to operate the shift unit in a second shift direction which is different from the first shift direction.

8. The bicycle shift operating device according to claim 1, wherein
   the first primary operating member is pivotally mounted on the mounting bracket about a second axis; and
   the shift unit includes a winding member pivoted toward the first shift direction as the operating member is pivoted from a rest position to an operated position about the first axis, and pivoted toward the first shift direction as the first primary operating member is pivoted from a rest position to an operated position about the second axis.

9. The bicycle shift operating device according to claim 8, further comprising
   a second primary operating member mechanically coupled to the shift unit to operate the shift unit in a second shift direction which is different from the first shift direction,
   the second primary operating member being pivotally mounted on the mounting bracket about a third axis, the winding member pivoting toward the second shift direction which is opposite to the first shift direction as the second primary operating member is operated from a rest position to an operated position around the third axis.

10. The bicycle shift operating device according to claim 9, wherein
    the second primary operating member includes a brake cable attachment structure that pulls a brake cable as the second primary operating member is pivoted from a rest position to a braking position about a braking axis.

11. The bicycle shift operating device according to claim 10, wherein the first primary operating member and the second primary operating member move together as the second primary operating member is pivoted about the braking axis.

12. The bicycle shift operating device according to claim 9, wherein
the first primary operating member and the second primary operating member move together as the second primary operating member is pivoted about the third axis.

13. The bicycle shift operating device according to claim 9, wherein
the second operating member remains stationary as the first primary operating member is moved to operate the shift unit.

* * * * *